US008693870B2

(12) United States Patent
Yuki

(10) Patent No.: US 8,693,870 B2
(45) Date of Patent: Apr. 8, 2014

(54) CONTROL APPARATUS, POLARIZATION MULTIPLEXING LIGHT MODULATOR, LIGHT TRANSMITTING APPARATUS, AND METHOD OF CONTROLLING POLARIZATION MULTIPLEXING LIGHT MODULATOR

(75) Inventor: Masahiro Yuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 12/476,334

(22) Filed: Jun. 2, 2009

(65) Prior Publication Data

US 2010/0054738 A1 Mar. 4, 2010

(30) Foreign Application Priority Data

Aug. 29, 2008 (JP) ................. 2008-222259

(51) Int. Cl.
*H04J 14/06* (2006.01)
*H04B 10/04* (2011.01)

(52) U.S. Cl.
USPC ............. 398/65; 398/182; 398/192; 398/195; 398/79

(58) Field of Classification Search
USPC .................... 398/198, 182, 192, 185
See application file for complete search history.

(56) References Cited

U.S. PATENT DOCUMENTS

| | | | |
|---|---|---|---|
| 7,068,950 B2 * | 6/2006 | Sinsky ........................... | 398/198 |
| 2003/0175033 A1 | 9/2003 | Taga et al. | |
| 2005/0213975 A1 * | 9/2005 | Gottwald et al. ............... | 398/65 |
| 2007/0263673 A1 * | 11/2007 | Agazzi et al. ................. | 370/516 |
| 2007/0264028 A1 | 11/2007 | Yuki et al. | |
| 2009/0097849 A1 * | 4/2009 | Childers et al. ................ | 398/79 |

FOREIGN PATENT DOCUMENTS

| | | |
|---|---|---|
| JP | 2002-344426 | 11/2002 |
| JP | 2003-338805 | 11/2003 |
| JP | 2005-65027 | 3/2005 |
| JP | 2005-531169 | 10/2005 |
| JP | 2007-329886 | 12/2007 |

OTHER PUBLICATIONS

D. van den Borne, et al., "1.6-b/s/Hz Spectrally Efficient Transmission Over 1700 km of SSMF Using 40 × 85.6-Gb/s POLMUX-RZ-DQPSK", Journal of Lightwave Technology, vol. 25, No. 1, Jan. 2007.
Japanese Office Action issued Aug. 21, 2012 in corresponding Japanese Patent Application No. 2008-222259.
Japanese Office Action mailed Jan. 22, 2013 for corresponding Japanese Application No. 2008-222259.

* cited by examiner

*Primary Examiner* — Oommen Jacob
(74) *Attorney, Agent, or Firm* — Staas & Halsey LLP

(57) ABSTRACT

The present invention provides a control apparatus including: an output monitor which monitors polarization-multiplexed output light output from a polarization multiplexing light modulator which modulates light of two systems independent of each other, polarization-multiplexes light signals of the two systems subjected to the light modulation, and outputs the polarization-multiplexed light signals; and a control unit which controls a delay time difference at a stage where the light signals of the two systems forming the polarization multiplexing light modulator are polarization-multiplexed based on a monitor result of the output monitor. The control apparatus controls a delay time difference between polarization channels easily or surely.

17 Claims, 22 Drawing Sheets

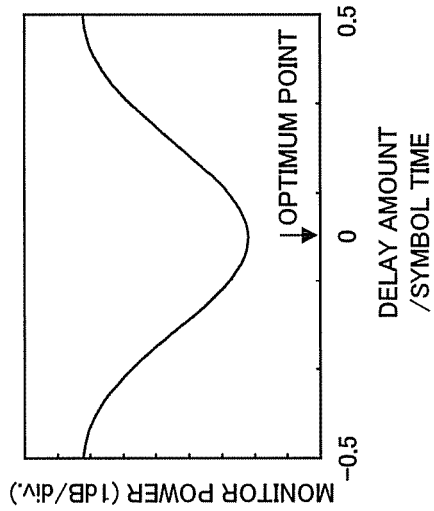
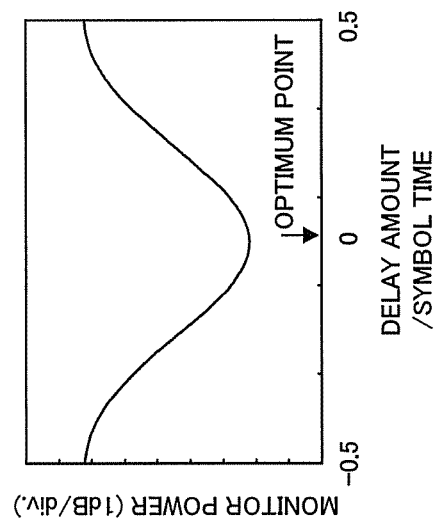
FIG. 13(a)
FIG. 13(b)

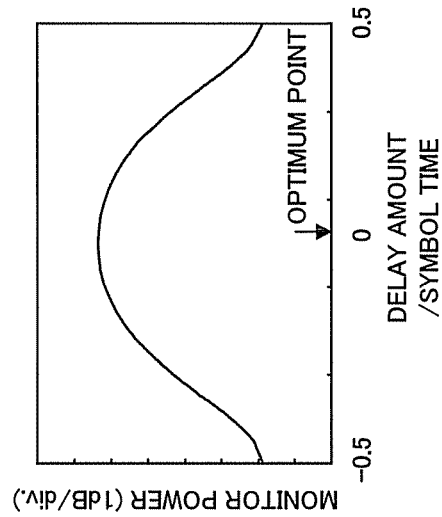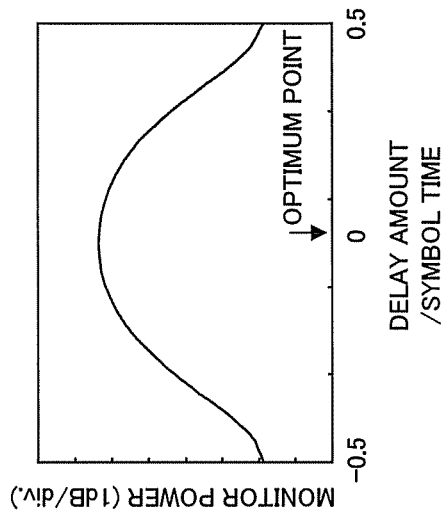

CONTROL APPARATUS, POLARIZATION MULTIPLEXING LIGHT MODULATOR, LIGHT TRANSMITTING APPARATUS, AND METHOD OF CONTROLLING POLARIZATION MULTIPLEXING LIGHT MODULATOR

CROSS-REFERENCE TO RELATED APPLICATION(S)

This application is based upon and claims the benefit of priority of the prior Japanese Patent Application No. 2008-222259, filed on Aug. 29, 2008, the entire contents of which are incorporated herein by reference.

FIELD

This disclosure relates to a control apparatus, a polarization multiplexing light modulator, a light transmitting apparatus, and a method of controlling a polarization multiplexing light modulator.

BACKGROUND

To realize an ultrafast light transmission system of 40 Gbits/s or higher, attention is paid to adoption of the polarization multiplexing technique. The polarization multiplexing technique is a method of, paying attention to the fact that a single wavelength has two polarization states which are orthogonal to each other, transmitting two independent pieces of signal information by using the two polarization states.

It is known that, in a polarization multiplexing transmission system, degree of deterioration in transmission quality due to the fiber nonlinear effect and PMD (Polarization Mode Dispersion) varies according to a relative delay time difference between polarization channels orthogonal to each other. For example, from the viewpoint of fiber nonlinearity tolerance, an interleave polarization multiplexing method in which the relative delay time difference between polarization channels orthogonal to each other is set to the half of symbol time is advantageous. On the other hand, from the viewpoint of PMD tolerance, a time align polarization multiplexing method in which the phases become the same is advantageous.

In the polarization multiplexing transmission system, to control deterioration in transmission quality due to the nonlinear tolerance and PMD, the relative delay time difference between polarization channels orthogonal to each other has to be controlled surely. However, even if the relative delay time difference between polarization channels is set at the initial setting, the relative delay time difference between the polarization channels which are orthogonal to each other may vary due to temperature change or deterioration with age. To address the problem, it is considered to compensate for a phase difference among drive signals of a plurality of modulators by using temperature monitor information. However, in this case, information such as temperature dependency, a characteristic of fluctuation with time, individual variations, and the like is preliminarily necessary for feed forward control using the temperature monitor information. For a simple and high-precision phase difference control, a further technical development is demanded.

Patent Document 1: Japanese Patent Application Laid-Open No. 2002-344426
Patent Document 2: Japanese Patent Application Laid-Open No. 2003-338805
Patent Document 3: Japanese Patent Application Laid-Open No. 2005-65027
Non-patent Document 1: D. van den Borne, et al., Journal of Lightwave Technology, Vol. 25, No. 1, pp. 222-232, January 2007.

SUMMARY

To realize the technical development, for example, the following means is used.

(1) A control apparatus including: an output monitor which monitors polarization-multiplexed output light that is output from a polarization multiplexing light modulator which performs light modulation on two systems independent of each other, polarization-multiplexes light signals of the two systems subjected to the light modulation, and outputs the polarization-multiplexed light signals; and a control unit which controls a delay time difference at a stage where the light signals of the two systems forming the polarization multiplexing light modulator are polarization-multiplexed based on a monitor result of the output monitor can be used.

(2) A polarization multiplexing light modulator including: a first modulating unit and a second modulating unit which perform light modulations of two systems independent of each other on input light; a polarization multiplexer which polarization-multiplexes light signals of the two systems subjected to light modulations in the first and second modulating units, and outputs the polarization-multiplexed light signals; an output monitor which monitors polarization-multiplexed output light that is output from the polarization multiplexer; and a control unit which controls a delay time difference at a stage where the light signals of the two systems are polarization-multiplexed in the polarization multiplexer based on a monitor result of the output monitor can be used.

(3) A light transmitting apparatus including the polarization multiplexing light modulator of (2) can be used.

(4) A method of controlling a polarization multiplexing light modulator can be used, the polarization multiplexing light modulator including a first modulating unit and a second modulating unit which perform light modulations of two systems independent of each other on input light, the first and second modulating units each having a light phase modulating unit which performs light phase modulation and a light intensity modulating unit which performs light intensity modulation depending on the light phase modulation in the light phase modulating unit, and including a polarization multiplexer which polarization-multiplexes light signals of the two systems subjected to light modulations in the first and second modulating units and output the polarization-multiplexed light signals. The method includes the steps of: performing first monitoring on polarization multiplexed output light that is output from the polarization multiplexer or light signals of the two systems subjected to the light modulation in the first and second modulating units; matching modulation timings of the light phase modulating unit and the light intensity modulating unit in each of the first and second modulating units based on a result of the first monitor; performing second monitoring on polarization multiplexed output light that is output from the polarization multiplexer; and controlling a delay time difference at a stage where the light signals of the two systems forming the polarization multiplexing light modulator are polarization-multiplexed based on a result of the second monitoring.

Additional objects and advantages of the invention (embodiments) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIGS. 13(a) and 13(b) are diagrams each depicting the relation between low-frequency component power monitored by a power monitor unit and a deviation amount (delay amount) of modulation timings between a phase modulating unit and an intensity modulating unit;

FIGS. 14(a) and 14(b) are diagrams each depicting the relation between frequency component power corresponding to baud rate monitored by a power monitor unit and a deviation amount (delay amount) of modulation timings between a phase modulating unit and an intensity modulating unit;

DESCRIPTION OF EMBODIMENTS

Embodiments will be described below with reference to the drawings. The following embodiments are illustrative and there is no intention to eliminate application of various modifications and techniques which will not be clarified below. That is, the embodiments can be variously modified without departing from the gist of the whole disclosure.

[A1] Description of First Embodiment

Figure 1:
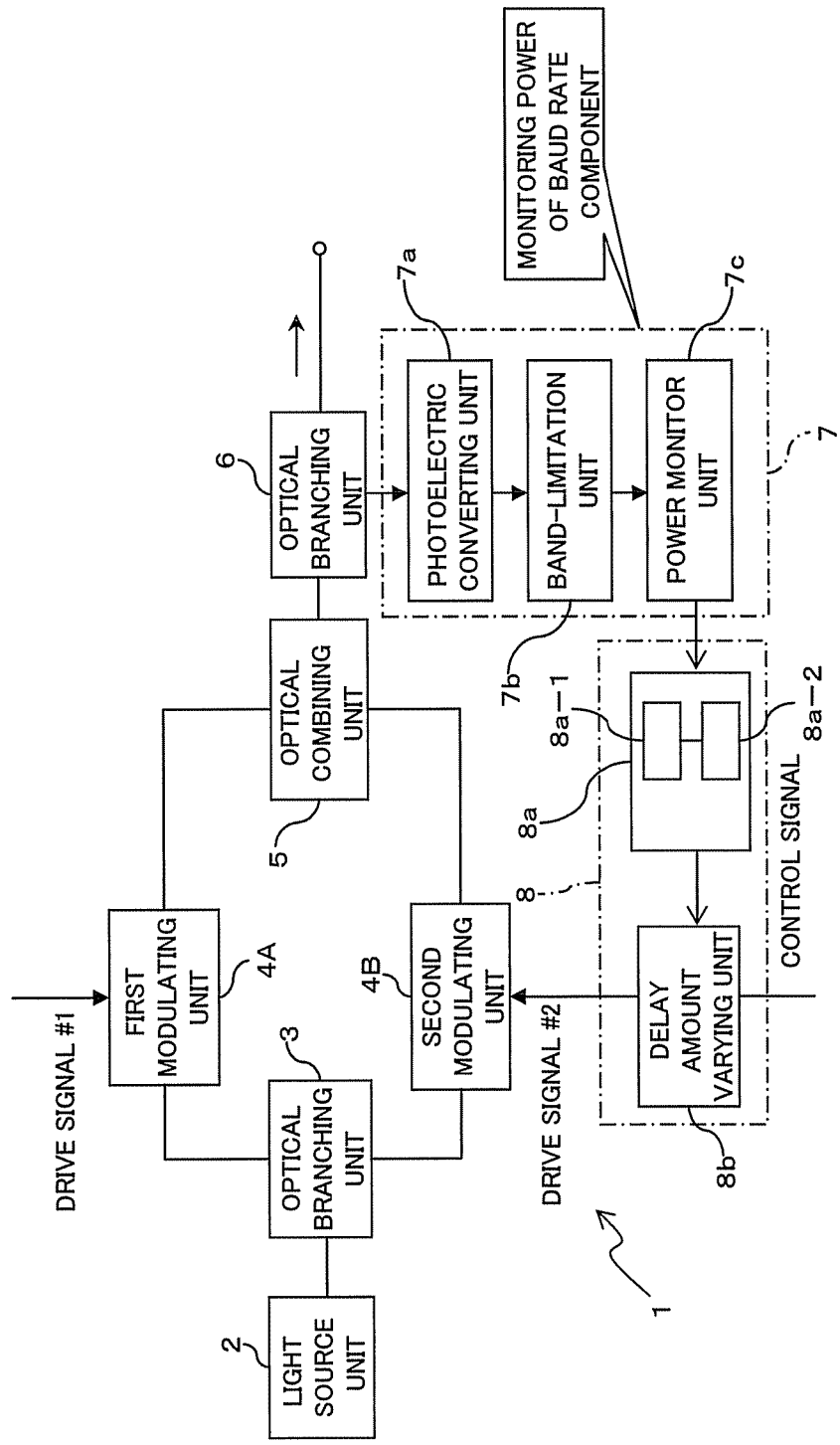
FIG. 1 is a diagram depicting an optical polarization multiplexing modulator as a first embodiment.

FIG. 1 is a diagram depicting an optical polarization multiplexing modulator as a first embodiment. A polarization multiplexing light modulator 1 depicted in FIG. 1 has, for example, a light source unit 2, an optical branching unit 3, a first modulating unit 4A, a second modulating unit 4B, an optical combining unit 5, an optical branching unit 6, a photoelectric converting unit 7a, a band limitation unit 7b, a power monitoring unit 7c, a delay control unit 8a, and a delay amount varying unit 8b. The photoelectric converting unit 7a, the band limitation unit 7b, the power monitoring unit 7c, the delay control unit 8a, and the delay amount varying unit 8b operate together to form an example of a control apparatus which controls polarization multiplexing modulation.

As an example of the light source unit (light source) 2, a laser diode (LD) which outputs light having a predetermined wavelength is used. The wavelength of light output from the light source unit 2 can be set as unit wavelength (wavelength of one channel) of wavelength division multiplexing (WDM).

The optical branching unit 3 branches light from the light source unit 2 into two pieces and guides them to the first and second modulating units 4A and 4B. As an example of the optical branching unit 3, a polarization beam splitter (PBS) which separates two polarized components orthogonal to each other in the light from the light source unit 2 and guides one of the polarized components to the first modulating unit 4A and the other polarized component to the second modulating unit 4B can be used.

The first and second modulating units 4A and 4B perform light modulations of two systems which are independent of each other on the input light beams. For example, the first and second modulating units 4A and 4B can be RZ-DQPSK modulating units which perform light modulations of equal bit rate and similar methods, for example, RZ-DQPSK modulation of 20 Gb/s based on data signals (drive signals #1 and #2) independent of each other. Obviously, other modulation methods such as DQPSK modulation and DQSK modulation can be adopted.

The optical combining unit 5 performs polarization multiplexing on the light signal resulting from the light modulations in the first and second modulating units 4A and 4B, and outputs the resultant signal as a polarization multiplexed signal. That is, the optical combining unit 5 combines (multiplexes) the light signals from the modulating units 4A and 4B each of which polarization states are orthogonal to each other. As an example of the optical combining unit 5, a polarization beam combiner (PBC) can be used.

As the optical branching unit 3, other than the PBS, for example, an optical coupler which branches power of light from the light source unit 2 can be also used. Similarly, as the optical combining unit 5, a unit other than the PBC such as an optical coupler which combines the light signals from the first and second light modulating units 4A and 4B can be also used.

In the optical paths between the optical branching unit 3 and the optical combining unit 5 via the light modulating units 4A and 4B, by using a polarization holding fiber, a polarization controller, or the like, a polarized wave state can be properly held and adjusted.

As the optical branching unit 6, for example, an optical coupler is used. The optical branching unit 6 branches a polarization multiplexed signal output from the optical combining unit 5, outputs one of the branched signals as transmission light, and guides the other branched signal to the photoelectric converting unit 7a.

The photoelectric converting unit 7a, the band limitation unit 7b, and the power monitor unit 7c operate together to function as an output monitor 7 which monitors a polarization multiplexing output light (polarization multiplexing signal light).

The photoelectric converting unit 7a receives the polarization multiplexing light signal from the optical branching unit 6 and converts it to an electric signal according to the amplitude change. A photodiode (PD) can be used as an example of the photoelectric converting unit 7a. A photodiode 7a which can detect at least a frequency component derived from the baud rate of light modulation in the first and second modulating units 4A and 4B from the polarization multiplexed-RZ-DQPSK signal received is used.

As the band limitation unit 7b, for example, a band pass filter (BPF) is used. The band limitation unit 7b performs band limiting process on an electric signal from the photoelectric converting unit 7a. The band limitation unit 7b passes, at least, frequency components derived from the baud rate of light modulation in the first and second modulating units 4A and 4B. When the photoelectric converting unit 7a has the function, the process in the band limitation unit 7b may not be performed.

Based on the electric signal subjected to the band limiting process in the band limitation unit 7b, the power monitor unit 7c monitors the power of the frequency component derived from the baud rate of light modulation in the modulating units 4A and 4B.

Figure 2:
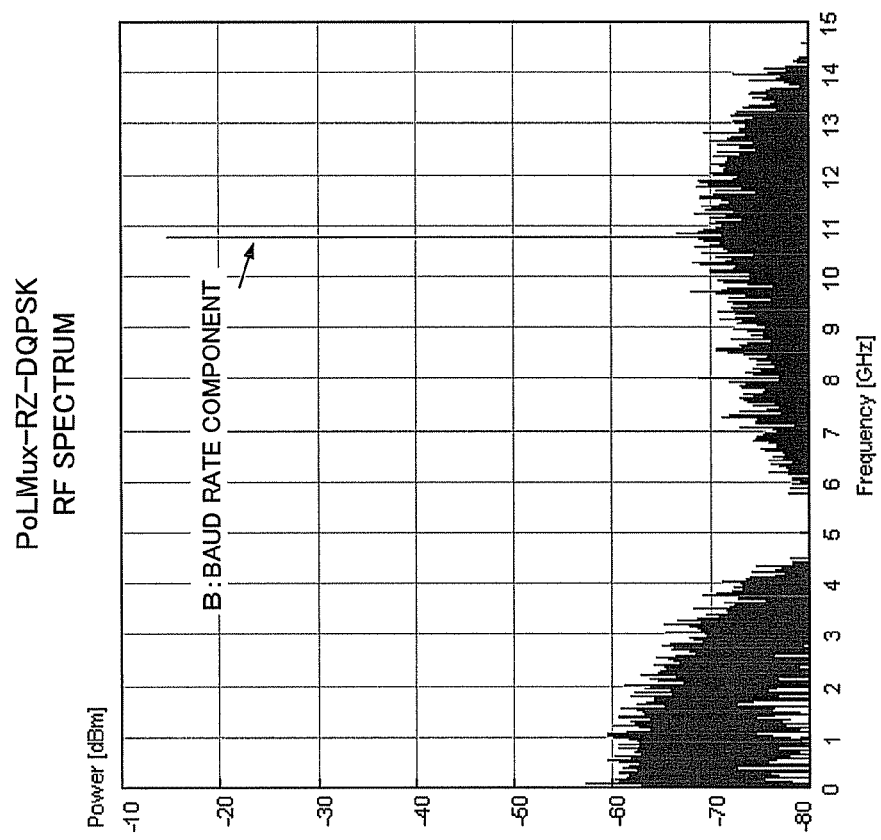
FIG. 2 depicts an example of a spectrum of an optical polarization multiplexing signal which is RZ-DQPSK modulated and polarization multiplexed by a light modulating unit.

FIG. 2 depicts an example of the spectrum of the polarization multiplexed-RZ-DQPSK signal subjected to RZ-DQPSK modulation and polarization multiplexing in the modulating units 4A and 4B. "B" in FIG. 2 depicts an example of the frequency component corresponding to the baud rate component monitored by the power monitor unit 7c. By performing RZ-DQPSK modulation of 20 Gb/s in each of the modulating units 4A and 4B, the polarization multiplexed signal light having the bit rate of 40 Gb/s is obtained. The baud rate at this time if 10 Gbaud, and a frequency component B depicted in FIG. 2 is a frequency component corresponding to the baud rate (10 Gbaud) component.

Figure 3:
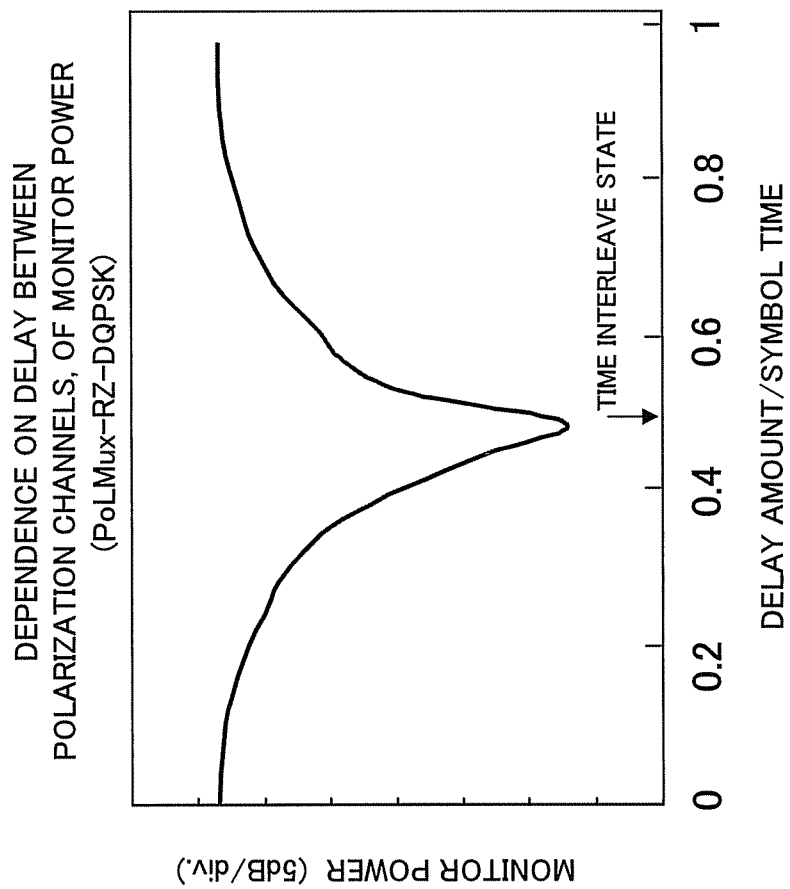
FIG. 3 is a diagram illustrating the relation between the delay time difference between light signals indicative of polarization components in polarization multiplexed signal light and power of a baud rate component monitored by a power monitor unit.

FIG. 3 is a diagram depicting the relation between the delay time difference between light signals indicative of polarization components in the polarization multiplexed signal light and the power of the baud rate component monitored by the power monitor unit 7c. As depicted in FIG. 3, there is the correlation between the power of the baud rate component and the delay time difference.

Concretely, in a time aligned state, that is, in the case where there is no delay time difference and symbol time difference is "0" or in the case where there is a delay time difference of one symbol time, the power monitored by the power monitor unit 7c becomes the maximum. On the other hand, in a time interleave state, that is, in the case where the delay time difference as symbol time is about 0.5, the power monitored by the power monitor unit 7c is the minimum.

The delay control unit 8a and the delay amount varying unit 8b operate together, thereby serving as an example of a control unit 8 which controls a delay time difference at the stage of polarization multiplexing performed by the optical combining unit 5 based on a result of the monitoring in the output monitor. Specifically, the control unit 8 has the delay control unit 8a and the delay amount varying unit 8b and controls the delay time difference between the light signals indicative of the polarization components in the polarization multiplexed signal light based on the result of monitor performed by the power monitor unit 7c as described above.

The delay control unit 8a receives the monitor result of the power of the frequency component corresponding to the baud rate as a monitor result from the power monitor unit 7c, and outputs a control signal for giving a delay time difference according to the monitor result to the delay amount varying unit 8b. The delay control unit 8a has, for example, a storage unit 8a-1 and a control signal output unit 8a-2.

Figure 4:
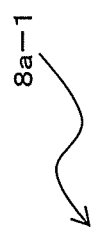
FIG. 4 is a diagram depicting a correspondence table of delay time differences according to the power of a frequency component derived from the baud rate.

For example, as depicted in FIG. 4, the storage unit 8a-1 stores a correspondence table of the delay time difference according to the power of the frequency component derived from the baud rate. The content of the correspondence table may be stored by measurement prior to start of operation of the apparatus. The control signal output unit 8a-2 outputs a control signal for controlling a delay time difference in accordance with the delay time difference corresponding to the power of the frequency component derived from the baud rate.

Concretely, the control signal output unit 8a-2 receives a monitor result of the power of the frequency component derived from the baud rate in the power monitor unit 7c and, with reference to the data in the storage unit 8a-1, obtains information related to the delay time difference corresponding to the received monitor result. The control signal output unit 8a-2 obtains the difference between the delay time difference obtained and a target delay time difference and outputs a control signal for giving a delay time difference according to the obtained difference to the delay amount varying unit 8b.

Alternatively, the control signal output unit 8a-2 may obtain, as a target power, the value of the monitored power as a target delay time difference from the storage unit 8a-1, and perform feedback control using a control signal to the delay amount varying unit 8b so that the monitor result from the power monitor unit 7c becomes the obtained target power.

A target delay time difference is given so that proper transmission characteristics (PMD tolerance characteristic and nonlinear tolerance characteristic) are obtained based on transmission path parameters such as the characteristic of polarization mode dispersion of a transmission path in a light transmission system to which the polarization multiplexing light modulator 1 is applied, a nonlinear characteristic, and the like. When emphasis is placed on the PMD tolerance characteristic, desirably, the target delay time difference becomes close to the symbol time difference "0" (time alignment). It is known that, when emphasis is placed on the nonlinear tolerance characteristic, desirably, the target delay time difference becomes close to the symbol time difference "0.5" (time interleave). Obviously, the target delay time can be set so as to balance both of the tolerance characteristics.

The delay amount varying unit 8b in the first embodiment gives a delay time difference to the modulation timings on the modulating units 4A and 4B based on a control signal from the delay control unit 8a. In other words, the control unit 8 controls the delay time difference by controlling the modulation timings on the first and second modulating units 4A and 4B which perform the light modulations of two systems.

Figure 5:
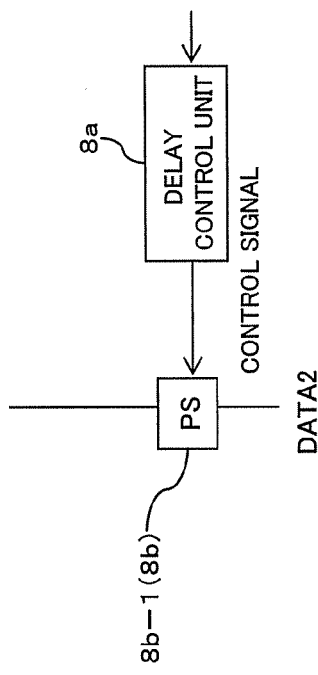
FIGS. 5 and 6 are diagrams depicting an example of a delay amount varying unit.
Figure 6:
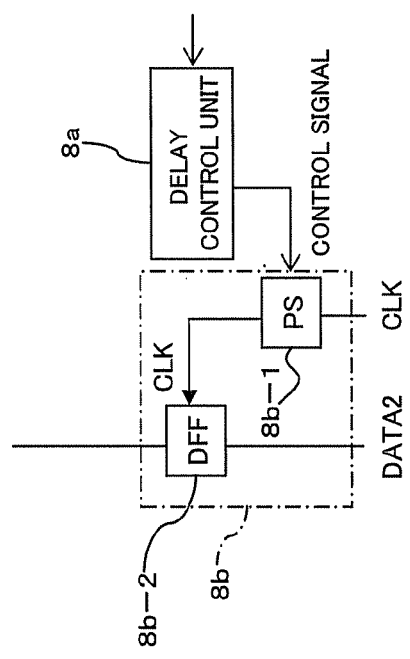

FIGS. 5 and 6 are diagrams each depicting an example of the delay amount varying unit 8b. The delay amount varying unit 8b depicted in FIGS. 5 and 6 varies the timing of supplying a data signal (DATA2) for light modulation to the second modulating unit 4B, thereby giving a predetermined delay time difference to the modulation timings in the first and second modulating units 4A and 4B.

In FIG. 5, the delay amount varying unit 8b has a phase shifter (PS) 8b-1 which shifts the phase of a data signal (DATA2) input to the second modulating unit 4B as one of the first and second modulating units 4A and 4B. That is, the PS 8b-1 depicted in FIG. 5 varies the timing of supplying the data signal (DATA2) to the second modulating unit 4B in accordance with a control signal from the control signal output unit 8a-2 (FIG. 1) as a component of the delay control unit 8a.

In FIG. 6, the delay amount varying unit 8b has the PS 8b-1 and a D flip flop (DFF) 8b-2. The PS 8b-1 delays an input clock signal in accordance with a control signal from the delay control unit 8a, and supplies the delayed signal to the DFF 8b-2. The DFF 8b-2 outputs the input data signal (DATA2) to the second modulating unit 4B synchronously with the clock signal whose delay amount is controlled by the PS 8b-1. In such a manner, the PS 8b-1 varies the timing of supplying the data signal to the second modulating unit 4B in accordance with the control signal from the delay control unit 8a.

Figure 7:
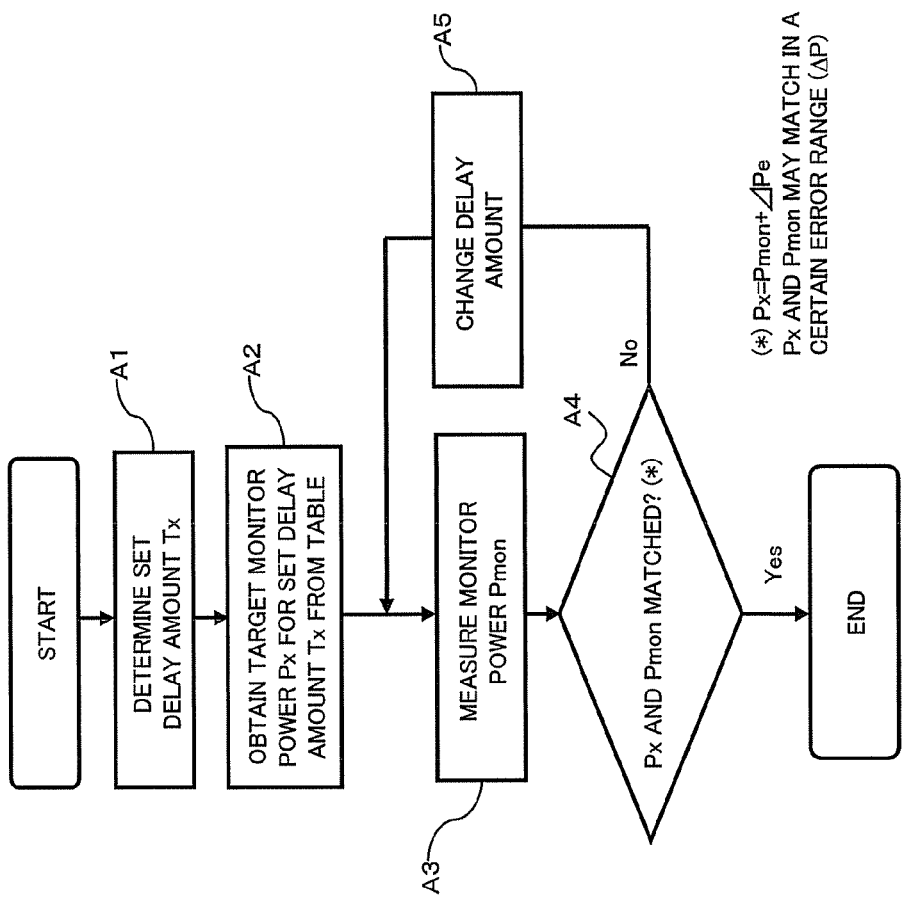
FIG. 7 is a flowchart depicting an example of a mode of controlling a delay time difference at a stage where light signals of two systems are polarization multiplexed in a light combining unit in the polarization multiplexing light modulator in the first embodiment.

Flowchart of FIG. 7 depicts an example of a mode of controlling a delay time difference at the stage of performing polarization multiplexing on light signals of the two systems in the light combining unit 5 in the polarization multiplexing light modulator 1. First, a delay time difference to be controlled (set delay time Tx) is determined based on transmission path parameters such as the characteristic of polarization mode dispersion of a transmission path in a light transmission system to which the polarization multiplexing light modulator 1 is applied, a nonlinear characteristic, and the like (step A1).

The control signal output unit 8a-2 obtains the value of the monitor power corresponding to the set delay amount Tx as a target monitor power Px by referring to the storage unit 8a-1 (step A2).

The delay control unit 8a controls the delay amount varying unit 8b so that the monitor result from the power monitor unit 7c (that is, the monitor result of the power of the frequency component corresponding to the baud rate component) becomes the target monitor power Px obtained as described above. Concretely, the power monitor unit 7c measures the power of the frequency component (step A3), and outputs a monitor power value Pmon as the measurement result to the control signal output unit 8a-2. The control signal output unit 8a-2 compares the monitor result Pmon from the power monitor unit 7c with the target monitor power Px and outputs a control signal to the delay amount varying unit 8b so that Pmon lies in the range of a predetermined error (ΔPe) of Px. That is, if Pmon lies out of the error range, the delay amount is changed by using the control signal to the delay amount varying unit 8b until Pmon falls in the error range (from "No" route of step A4 to step A5).

When the monitor result from the power monitor unit 7c falls in the predetermined error range with respect to the target monitor power Px, the feedback control of varying the delay time difference is finished, and the delay time difference at that time is maintained (Yes route of step A4).

As described above, in the first embodiment, the delay time difference between polarization channels can be easily and surely controlled and there is an advantage that degradation of the transmission characteristics can be suppressed.

[A2] Description of Modification of First Embodiment

Figure 8:
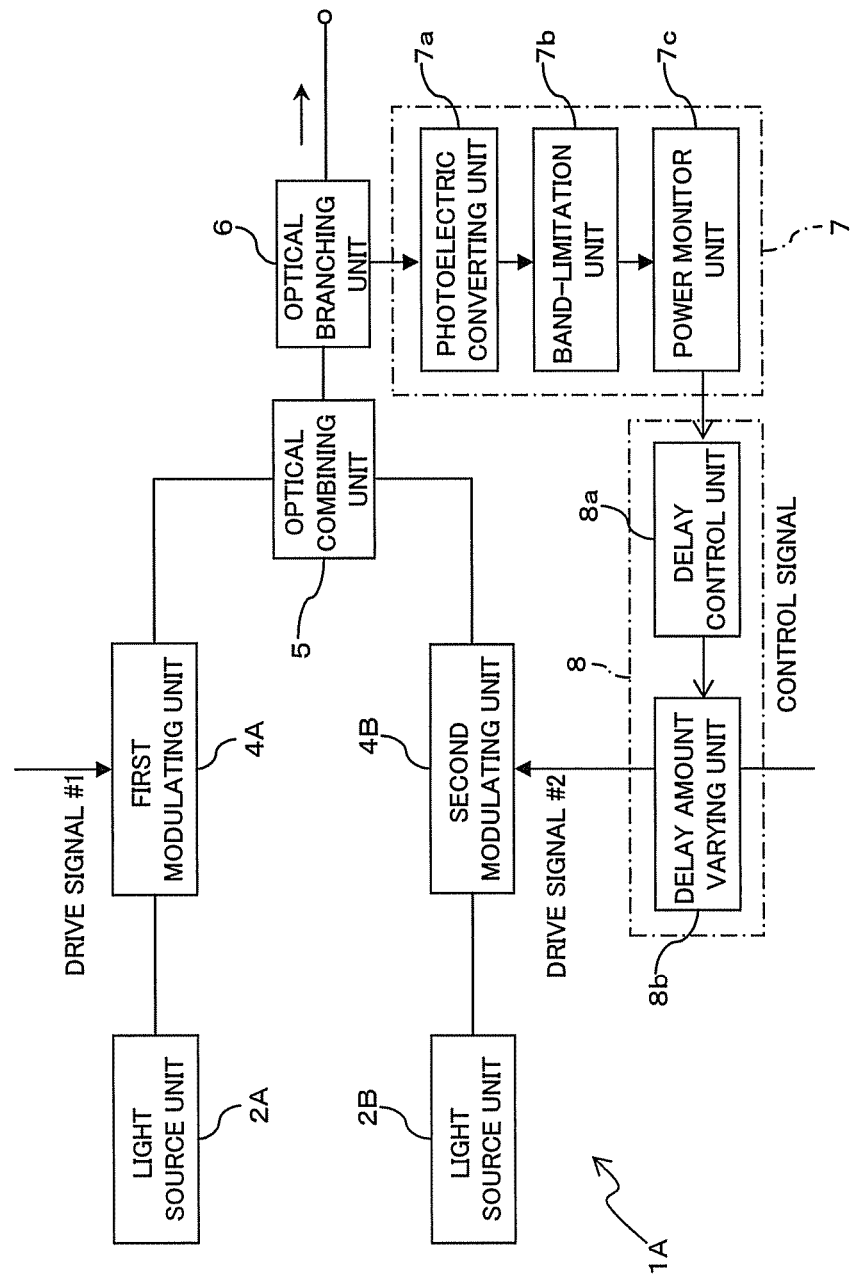
FIGS. 8 and 9 are diagrams depicting a modification of the first embodiment.

FIG. 8 is a diagram depicting a polarization multiplexing light modulator 1A as a first modification of the first embodiment. The polarization multiplexing light modulator 1A depicted in FIG. 8 is different from the modulator 1 depicted in FIG. 1 in that a first light source unit 2A which outputs input light to the first modulating unit 4A and a second light source unit 2B which outputs input light to the second modulating unit 4B are provided and the optical branching unit 3 which branches light from a single light source is not provided. The other elements are basically similar to those depicted in FIG. 1.

In the polarization multiplexing light modulator 1A constructed as described above, allowance can be provided for input light powers to the first and second modulating units 4A and 4B each employing a modulating method requiring a light power of a considerable degree (such as RZ-DQPSK).

Figure 9:
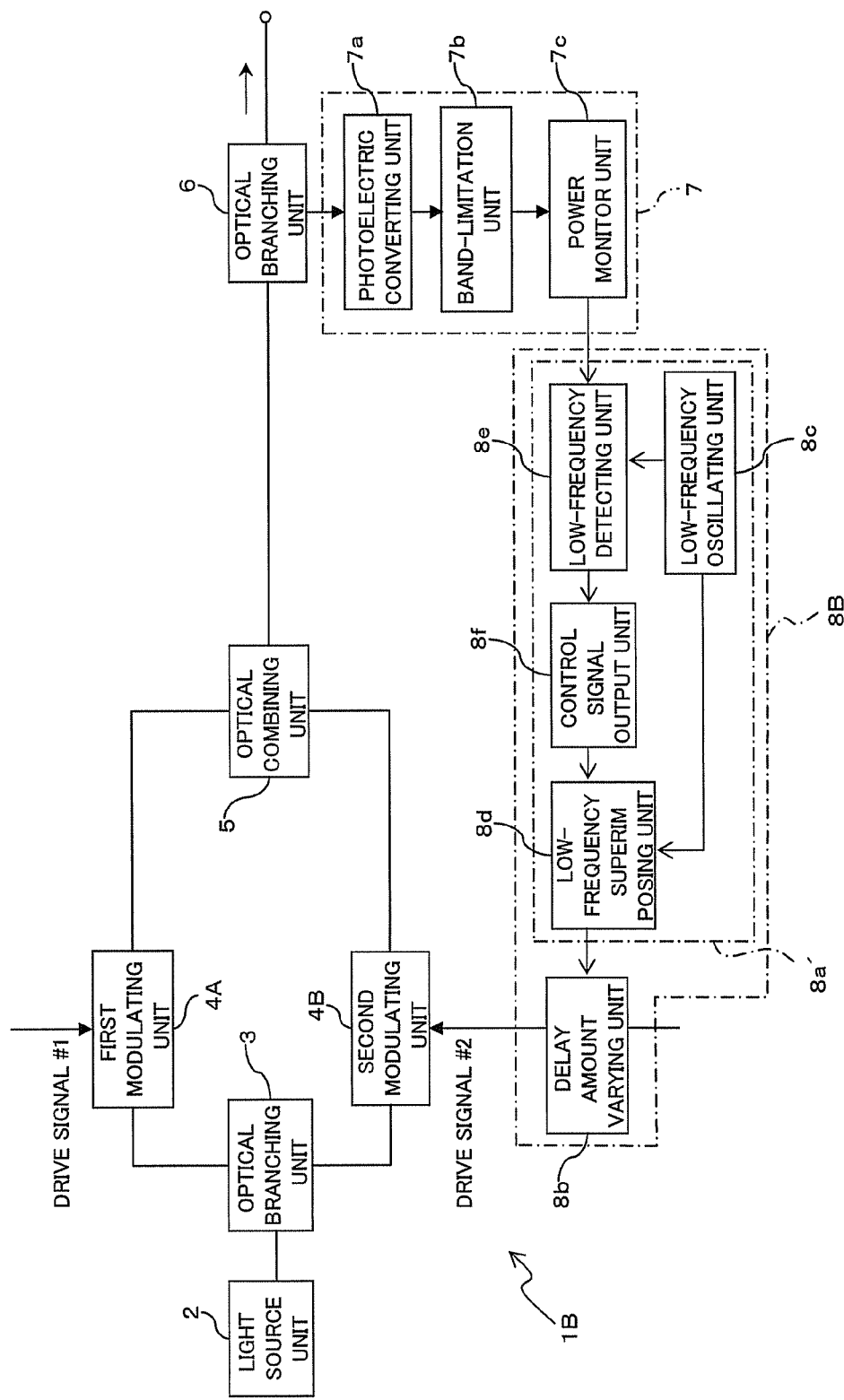

FIG. 9 is a diagram depicting a polarization multiplexing light modulator 1B as a second modification of the first embodiment. The polarization multiplexing light modulator 1B depicted in FIG. 9 is different from the modulator of FIG. 1 in the mode of a control unit 8B. The control unit 8 depicted in FIG. 1 controls the delay time difference by comparing the monitor result from the power monitor unit 7c and the target monitor power obtained from the correspondence table stored in the storage unit 8a-1. In contrast, the control unit BB depicted in FIG. 9 controls the delay time difference by using dithering and can control the delay time different to the target level without using the storage unit 8a-1.

The control unit BB has the delay amount varying unit 8b similar to that of FIG. 1 and a delay control unit 8a' different from the delay control unit 8a depicted in FIG. 1. The delay control unit 8a' has a low-frequency oscillating unit 8c, a low-frequency superimposing unit 8d, a low-frequency detecting unit 8e, and a control signal output unit 8f. The low-frequency oscillating unit 8c oscillates a sine-wave signal having frequency f0. The sine-wave signal is a low-frequency signal having the frequency f0 which is sufficiently lower than the frequency corresponding to the baud rate in the first and second modulating units 4A and 4B, and has an amplitude which is small enough to exert no influence on transmission/reception of a light signal but can be monitored by being discriminated from the other frequency components (see the spectrums other than B in FIG. 2).

The low-frequency superimposing unit 8d superimposes a low-frequency signal from the low-frequency oscillating unit 8c on the control signal for controlling the delay time difference in the delay amount varying unit 8b. The low-frequency signal oscillated by the low-frequency oscillating unit 8c is supplied to the delay amount varying unit 8b via the low-frequency superimposing unit 8d. In the delay amount varying unit 8b, a relative delay time difference between the drive signals to the first and second modulating units 4A and 4B, that is, the delay time difference between the polarization channels changes periodically in accordance with the low-frequency signal.

The power monitor unit 7c monitors the power of the frequency component corresponding to the baud rate included in the polarization multiplexed light signal. In the monitor result, periodical fluctuations according to the low-frequency signal superimposed on the control signal for the delay time difference can be included. In other words, the output monitor 7 monitors the frequency components derived from the baud rate in the light modulations in two systems (two polarization channels) included in output light of the polarization multiplexing light modulator 1 and, in addition, a low-frequency component of a frequency lower than the baud rate. In this case, as the band-limitation unit 7b, a low pass filter having a cutoff frequency higher than the baud rate frequency may be used. In the case where the photoelectric converting unit 7a has the function, the band-limitation unit 7b may not be disposed.

The low-frequency detecting unit 8e in the control unit 8B detects a fluctuation derived from the low-frequency signal superimposed by the low-frequency superimposing unit 8d, in the power of the frequency component corresponding to the baud rate from the monitor result of the output monitor 7. Concretely, using a low-frequency signal oscillated (generated) by the low-frequency oscillating unit 8c, the component signal of the low frequency f0 included in the output signal from the power monitor unit 7c, or the component signal of a frequency 2f0 which is twice as high as the low frequency f0 is synchronously detected.

Figure 10:
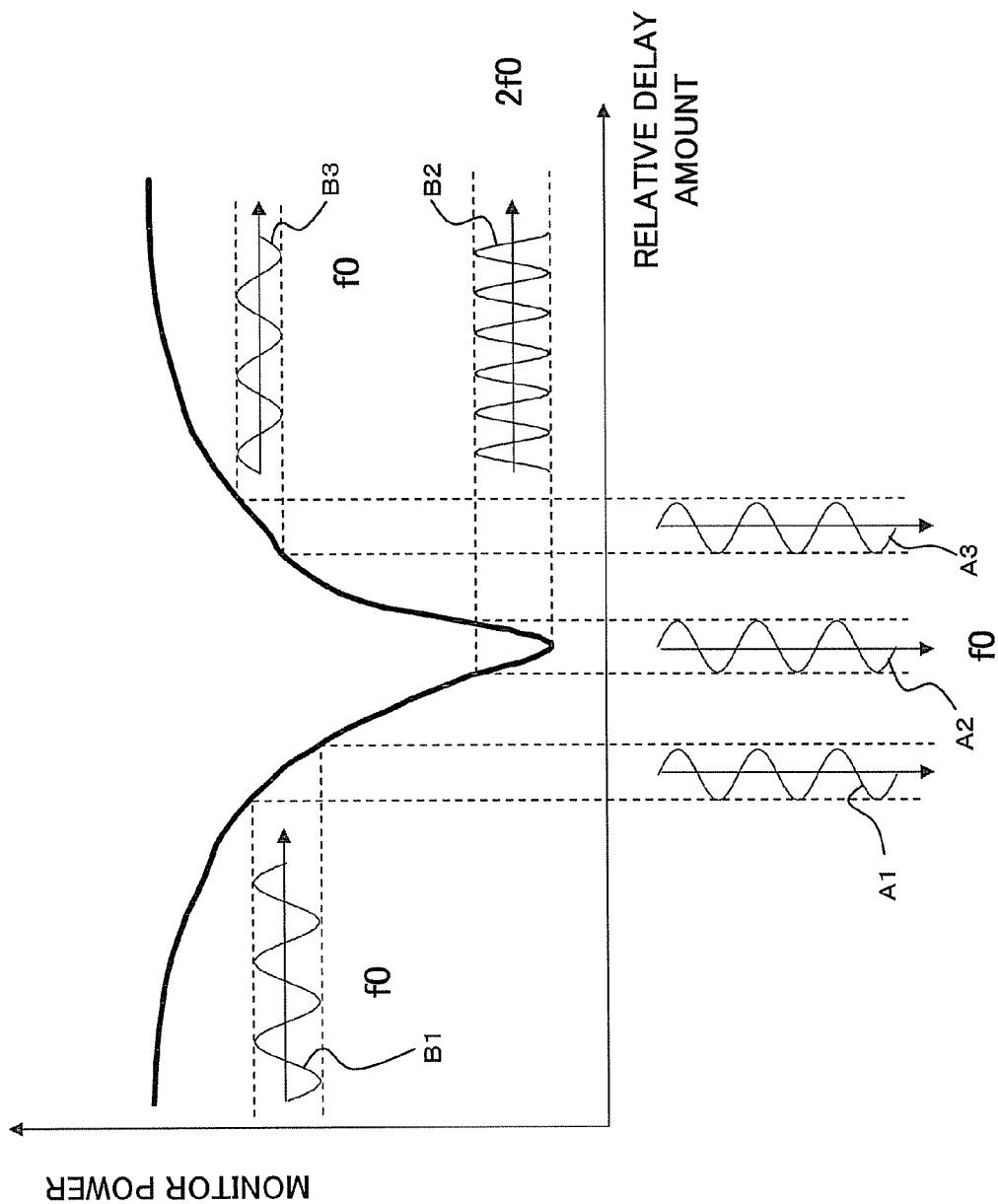
FIG. 10 is a diagram depicting the relation of low-frequency components included in a monitor power obtained by superimposing a low-frequency signal on a control signal for controlling a relative delay amount (delay time difference)

The control signal output unit 8f outputs a control signal to the delay amount varying unit 8b based on the detection result of the low-frequency detecting unit 8e. FIG. 10 is a diagram depicting the relation of low-frequency components included in the monitor power obtained by superimposing the low-frequency signal on the control signal for controlling the relative delay amount (delay time difference).

FIG. 3 depicts an example of the relation between the delay time difference of the light signals modulated in the two polarization channels and the monitor power of the baud rate frequency component in the polarization channel power monitor unit 7c. In the modification depicted in FIG. 9, the relation is used, and the control signal is output so that the delay time difference becomes the target level in the control signal output unit 8f based on the amplitude or phase of the component signal of the frequency f0 or 2f0 detected by the low-frequency detecting unit 8e.

For example, the case where there is a delay time difference between the time alignment state (the delay time difference of about 0 or one symbol amount) and the time interleave state (the delay time difference of about 0.5 symbol) (refer to A1 and A3 in FIG. 10) will be examined. In this case, the relative delay amount between the polarization channels changes at the frequency f0 by the low-frequency signal superimposed on the control signal, so that the baud rate frequency component monitored by the power monitor unit 7c also fluctuates at the frequency f0 (refer to B1 and B3 in FIG. 10).

The tilt of fluctuation of the monitor power value in the time alignment state and that in the time interleave state are different from each other, and the tilt of fluctuation of the monitor power value becomes gentler toward the time alignment side. As a result, in the case where a control signal which is relatively closer to the delay time difference in the time interleave state than that in the time alignment state (A1 in FIG. 10), the amplitude of the fluctuation component of the frequency f0 monitored by the power monitor unit 7c is relatively large is given (B1 in FIG. 10). On the other hand, in the case where a control signal which is relatively closer to the delay time difference in the time alignment state is given (A3 in FIG. 10), the amplitude of the fluctuation component of the frequency f0 monitored by the power monitor unit 7c is relatively small (B3 in FIG. 10).

In the case where the delay time difference corresponds to almost the time interleave state, the delay time difference fluctuates around the minimum point of the monitor power in FIG. 10 (FIG. 3). Consequently, as the low-frequency component monitored by the power monitor unit 7c, the 2f0 component is more dominant than the frequency f0 component. In other words, in the case where the control signal (A2 in FIG. 10) to which the delay time difference around the minimum point of the monitor power is given is input to the delay amount varying unit 8b, as the low-frequency component monitored by the power monitor unit 7c, the f0 component becomes smaller, and the 2f0 component becomes larger (B2 in FIG. 10). Since the control signals A1 and A3 are not control signals to which the delay time difference around the minimum point of the monitor power is given, the frequency f0 component is more dominant than the frequency 2f0 component (B1 and B3 in FIG. 10).

Therefore, in the case where the target delay time difference is set to, for example, the time interleave state, the control signal output unit 8f performs feedback-control on the delay amount varying unit 8b so that the low-frequency f0 component detected by the frequency detecting unit 8e becomes the minimum by using a control signal to be output. Alternatively, the control signal output unit 8f performs feedback-control on the delay amount varying unit 8b so that the low-frequency 2f0 component detected by the frequency detecting unit 8e becomes the maximum.

In the case where the target delay time difference is set to, for example, the time alignment state, the control signal output unit 8f performs feedback-control on the delay amount varying unit 8b so that the low-frequency f0 component detected by the frequency detecting unit 8e becomes the maximum by using a control signal to be output. Alternatively, the control signal output unit 8f performs feedback-control on the delay amount varying unit 8b so that the low-frequency 2f0 component detected by the frequency detecting unit 8e becomes the minimum.

In this case, the phase of the low-frequency f0 component to be monitored on the side of the large delay time difference, that is, in the case where the component is deviated toward the delay time difference of about one symbol (B3 in FIG. 10) and that on the side of the small delay time difference, that is in the case where the component is deviated toward the delay time difference of about zero symbol (B1 in FIG. 10) are opposite to each other. Therefore, the control signal output unit 8f can determine the control direction of the phase shift amount in the delay amount varying unit 8b, that is, whether the phase shift amount should be increased or decreased based on the phase of the f0 component signal detected by the frequency detecting unit 8e.

As the target delay time difference, a value other than the delay time difference in the time interleave state and that in the time alignment state may be also used. In this case, the delay amount varying unit 8b can be feedback-controlled so that the amplitude value, the phase, or the like of the component of the low frequency f0 or the like becomes a value corresponding to the target delay time difference.

Therefore, the polarization multiplexing light modulator 1B depicted in FIG. 9 has an advantage similar to that of the first embodiment and, in addition, can control to the target level without using the storage unit 8a-1.

In FIGS. 1, 8, and 9, the delay time of the drive signal (data signal) to the light modulating unit 4B is controlled in the delay amount varying unit 8b. If a required relative delay time difference can be obtained, the drive signal delay time can be controlled in both of the light modulating units 4A and 4B, or the delay time of the drive signal of the other light modulating unit 4A may be controlled.

[B] Description of Second Embodiment

Figure 11:
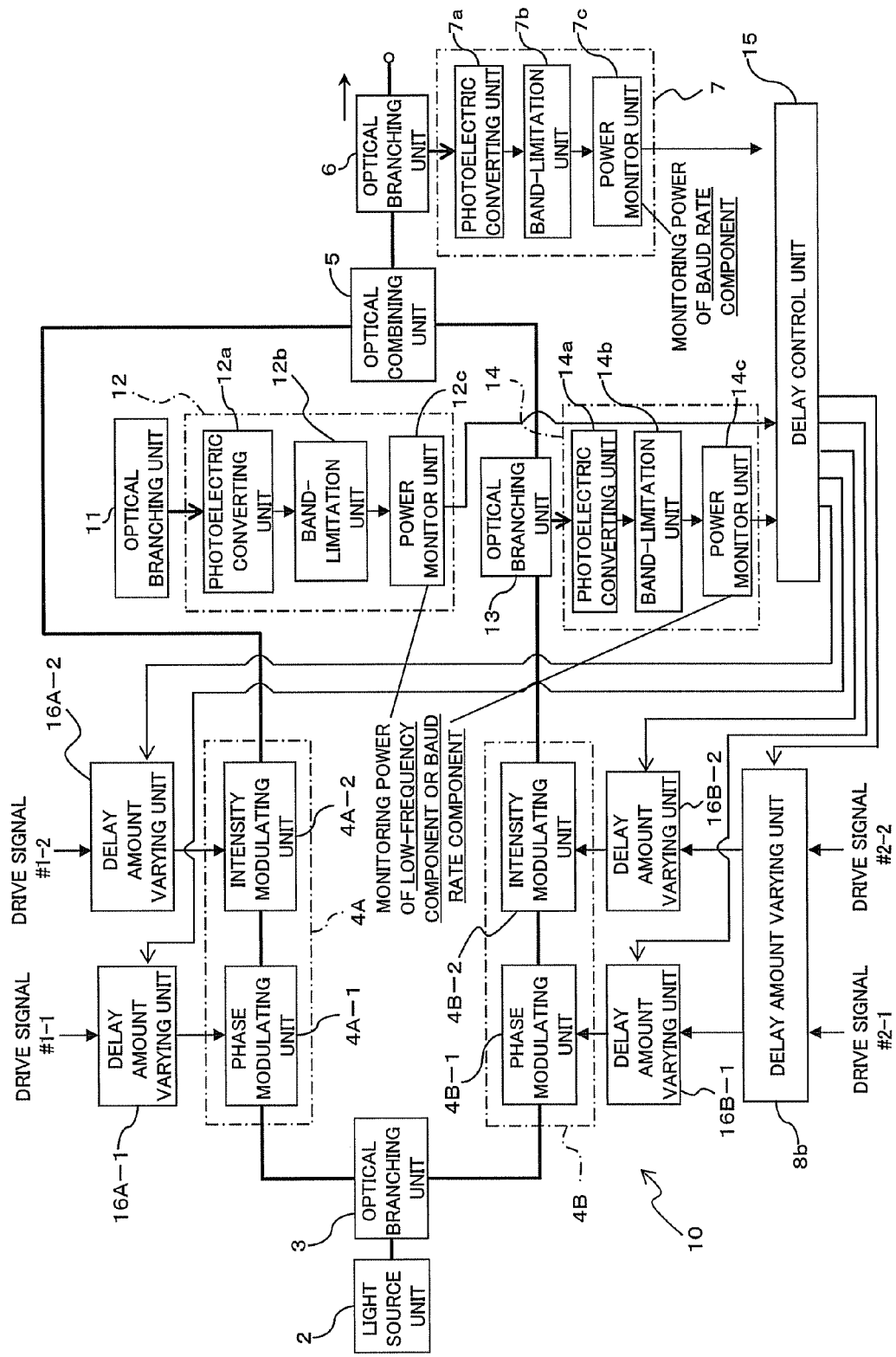
FIG. 11 is a diagram depicting a polarization multiplexing light modulator as a second embodiment.

FIG. 11 is a diagram depicting a polarization multiplexing light modulator 10 of a second embodiment. In a manner similar to the first embodiment, the polarization multiplexing light modulator 10 depicted in FIG. 11 controls the delay time difference between the polarization channels. In FIG. 11, components designated with the same reference numerals as those of FIG. 1 are similar to those of FIG. 1.

A first phase modulating unit 4A-1 in the first modulating unit 4A performs phase modulation such as DQPSK modulation based on a data signal (drive signal #1-1) on input light from the optical branching unit 3. A first intensity modulating unit 4A-2 performs RZ light modulation on a drive signal #1-2 (clock signal) on a light signal from the first phase modulating unit 4A-1. By the modulation, phase modulated light of the first phase modulating unit 4A-1 can be modulated to an RZ light signal which enters a quenched state at an inter-symbol timing.

Similarly, a second phase modulating unit 4B-1 in the second modulating unit 4B performs phase modulation such as DQPSK modulation based on a data signal (drive signal #2-1) independent of the first phase modulating unit 4A-1. A second intensity modulating unit 4B-2 performs RZ intensity modulation using a drive signal #2-2 (clock signal) on phase modulated light from the second phase modulating unit 4B-1, thereby obtaining an RZ light signal which enters a quenched state at an inter-symbol timing.

Although the first and second phase modulating units 4A-1 and 4B-1 are disposed on the upstream side in the light propagation direction of the first and second intensity modulating units 4A-2 and 4B-2 in the second embodiment, they may be disposed in the opposite sides.

Different from the first embodiment, in the polarization multiplexing light modulator 10, further, modulation timings of the phase modulation and the intensity modulation in light signals of the different systems (light signals in the polarization channels) are matched. Specifically, the modulation timings of the first phase modulating unit 4A-1 and the first intensity modulating unit 4A-2 in the first modulating unit 4A are matched. The modulation timings of the second phase modulating unit 4B-1 and the second intensity modulating unit 4B-2 in the second modulating unit 4B are matched.

The polarization multiplexing light modulator 10 has optical branching units 11 and 13, a first light signal monitor 12, a second light signal monitor 14, a delay control unit 15, and delay amount varying units 16A-1, 16A-2, 16B-1, and 16B-2.

The optical branching unit 11 branches a light signal of one of the systems modulated by the first modulating unit 4A and guides one of the branched light signals to the optical combining unit 5 and the other light signal to the first signal light monitor 12. The optical branching unit 13 branches a light signal of one of the systems modulated by the second modulating unit 4B and guides one of the branched light signals to the optical combining unit 5 and the other light signal to the second signal light monitor 14.

The first signal light monitor 12 monitors the light signal modulated by the first modulating unit 4A, and the second signal light monitor 14 monitors the light signal modulated by the second modulating unit 4B. The first and second signal light monitors 12 and 14 have equivalent configurations. In the following, the configuration of the first signal light monitor 12 will be focused and described (reference numerals 12a to 12c). Obviously, the description applies to the second signal light monitor 14 (reference numerals 14a to 14c).

Figure 12:
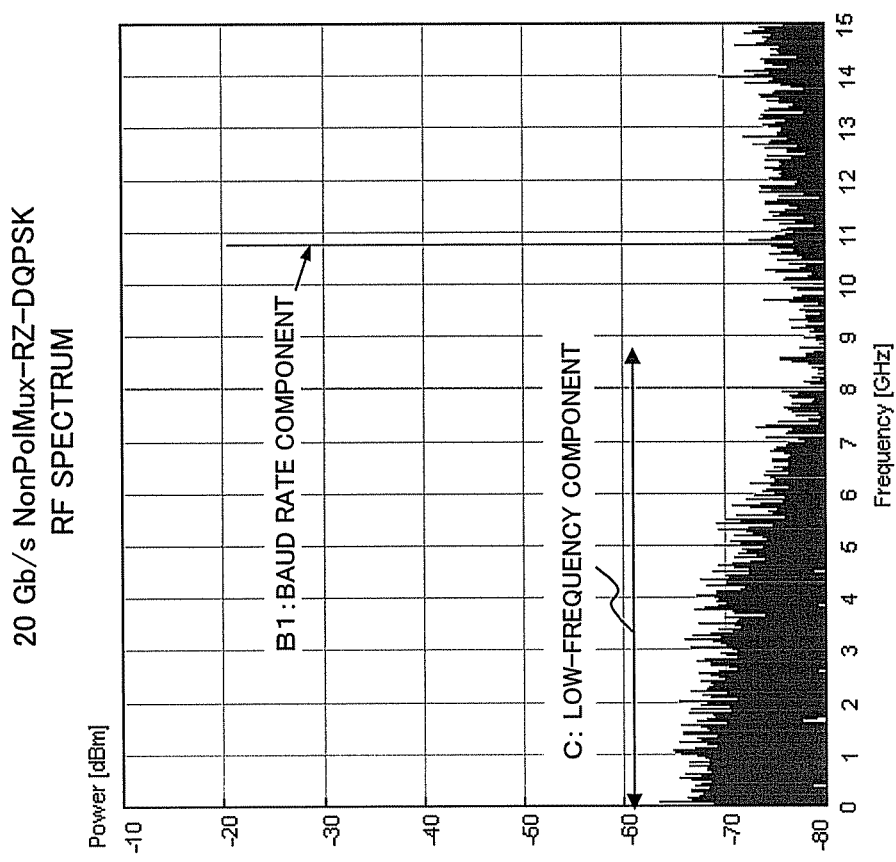
FIG. 12 is a diagram depicting an example of the spectrum of modulation light prior to polarization multiplexing.

The first signal light monitor 12 monitors the signal light modulated by the first modulating unit 4A, that is, signal light prior to combining operation in the optical combining unit 5. Concretely, the power of a frequency component derived from the baud rate (for example, a frequency component corresponding to the baud rate) or the power of a low-frequency component of a frequency lower than the frequency corresponding to the baud rate is monitored. For example, in the case of performing RZ-DQPSK modulation of 20 Gb/s in the first modulating unit 4A as depicted in FIG. 12, the power of a frequency component B1 of 10 GHz corresponding to the baud rate, or the power of a low-frequency component C is monitored.

The first signal light monitor 12 has a photoelectric converting unit 12a, a band-limitation unit 12b, and a power monitor unit 12c. The photoelectric converting unit 12a receives the light signal supplied via the optical branching unit 11 and modulated by the first modulating unit 4A and converts the light signal into an electric signal. The band-limitation unit 12b performs band limiting process for passing frequency components to be monitored on the electric signal from the photoelectric converting unit 12a, and outputs the process signal to the power monitor unit 12c. The power monitor unit 12c monitors the power of the frequency component to be measured in the signal from the band-limitation unit 12b, and outputs the monitor result to the delay control unit 15.

In the case of monitoring the power of the low-frequency component (C in FIG. 12) by the first signal light monitor 12, the band-imitation unit 12b can be constructed by, for example, a capacitor which cuts a direct current component (DC component) and a low-pass filter which cuts high frequency components equal to or higher than the baud rate. In the case where the photoelectric converting unit 12a has the function of the low-pass filter, the band-limitation unit 12b as the low-pass filter may not be disposed.

The power monitor unit 12c monitors the power of a low-frequency signal of an AC component remaining after the DC component is cut by the capacitor 12b, and outputs the monitor result to the delay control unit 15. As another example of the band-limitation unit 12b, without interposing the capacitor which cuts direct current, the low-pass filter which passes the low-frequency component C can be used. With this configuration as well, the power-monitor unit 12c can monitor the low-frequency component C. The low-frequency component is a component of a frequency band lower than the frequency corresponding to the baud rate.

In the case where the first signal light monitor 12 monitors the frequency component (B1 in FIG. 12) corresponding to the baud rate, as the band-limitation unit 12b, a band-pass filter which passes the frequency component can used. When an output of the photoelectric converting unit 12a is an electric signal subjected to the band limitation, the band-limitation unit 12b can be properly omitted.

In a manner similar to the first embodiment, the delay control unit 15 has the function of the delay control unit 8a which controls the delay amount between the polarization channels by the delay amount varying unit 8b based on the monitor result from the power monitor unit 7c. Further, based on the monitor result from the first signal light monitor 12, the delay control unit 15 controls the modulation timings in the first phase modulating unit 4A-1 and the first intensity modulating unit 4A-2 constructing the first modulating unit 4A by the delay amount varying units 16A-1 and 16A-2, respectively. Based on the monitor result from the second signal light monitor 14, the delay control unit 15 controls the modulation timings in the second phase modulating unit 4B-1 and the second intensity modulating unit 4B-2 constructing the second modulating unit 4A by the delay amount varying units 16B-1 and 16B-2, respectively.

FIG. 13A(a) illustrates the relation between a low-frequency component power monitored by the power monitor unit 12c and a deviation amount (delay amount) in the modulation timing between the first phase modulating unit 4A-1 and the first intensity modulating unit 4A-2 in the case of using the capacitor as the band-limitation unit 12b. FIG. 13(b) illustrates the relation between a low-frequency component power monitored by a power monitor unit 14c and a deviation amount in the modulation timing between the second phase modulating unit 4B-1 and the second intensity modulating unit 4B-2 in the case of using the capacitor as a band-limitation unit 14b.

The horizontal axis of each of FIGS. 13(a) and 13(b) indicates the deviation amount and is associated with a symbol time difference. It can be therefore said that the closer the value of the horizontal axis to "symbol time difference 0" is, the more the modulation timing is matched.

As depicted in FIG. 13(a), when the modulation timings in the first phase modulating unit 4A-1 and the first intensity modulating unit 4A-2 match each other (when the symbol time difference is zero), the power of the low frequency component monitored by the power monitor unit 12c becomes the smallest (minimum).

The delay amount varying unit 16A-1 receives a control signal from the delay control unit 15 and controls the modulation timing in the first phase modulating unit 4A-1. Based on the control signal from the delay control unit 15, the delay amount varying unit 16A-2 also variably controls the modulation timing in the first intensity modulating unit 4A-2.

As described above, the delay control unit 15 controls the delay amount varying units 16A-1 and 16A-2 so that the monitor result from the power monitor unit 12c becomes the smallest (minimum), thereby matching the modulation timings in the first phase modulating unit 4A-1 and the first intensity modulating unit 4A-2.

Similarly, as depicted in FIG. 13(b), it can be said that the position where the power of the low-frequency component monitored by the power monitor unit 14c becomes the minimum is the optimum point where the modulation timings in the second phase modulating unit 4B-1 and the second intensity modulating unit 4B-2 match. The delay control unit 15 controls the delay amount varying units 16B-1 and 16B-2 so that the monitor result from the power monitor unit 14c becomes the smallest (minimum), thereby matching the modulation timings in the second phase modulating unit 4B-1 and the second intensity modulating unit 4B-2.

In the case where the band-limitation units 12b and 14b have a filter configuration for passing direct current components, the relation between the power of the low-frequency component monitored and the deviation amount of the modulation timings (delay amount) has characteristics opposite to those of the case of FIGS. 13A and 13B. Specifically, when the deviation amount of the modulation timings is the optimum (deviation amount 0), the power monitored by the power monitor units 12c and 14c becomes the largest (maximum). As the deviation amount of the modulation timings increases from 0 to about ±0.5 symbol time, the monitor power decreases. Consequently, the control target in the modulation timing control of the delay control unit 15 is the control point at which the monitor power of the power monitor unit 12c becomes the largest (maximum). Similarly, the control target in the delay control unit 15 is the control point at which the monitor power of the power monitor unit 14c becomes the largest (maximum).

In the case of monitoring the power of the frequency component corresponding to the baud rate in each of the first and second signal light monitors 12 and 14, the monitor power changes with respect to the modulation timing deviation as depicted in FIGS. 14(a) and 14(b). As depicted in FIG. 14(a), when the modulation timings of the first phase modulating unit 4A-1 and the first intensity modulating unit 4A-2 become the optimum, the power monitored by the power monitor unit 12c becomes the maximum. As depicted in FIG. 14(b), when the modulation timings of the second phase modulating unit 4B-1 and the second intensity modulating unit 4B-2 become the optimum, the power monitored by the power monitor unit 14c becomes the maximum.

Therefore, in the case of monitoring the power of the frequency component corresponding to the baud rate in the first and second signal light monitors 12 and 14, the delay control unit 15 controls the modulation timings so that the monitor power in each of the power monitor units 12c and 14c becomes the maximum power.

As described above, the delay control unit 15 controls to match the modulation timings in accordance with the configurations of the band-limitation units 12b and 14b and the frequency component to be monitored.

A mode of performing the modulation timing delay control in the delay control unit 15 in accordance with the monitor result of the power monitor units 12c and 14c can be realized by a control based on a table reference conforming to the delay control unit 8a depicted in FIG. 1, or realized by a control based on dithering conforming to the delay control unit 8a' depicted in FIG. 9 when monitoring the frequency component corresponding to the baud rate.

Figure 15:
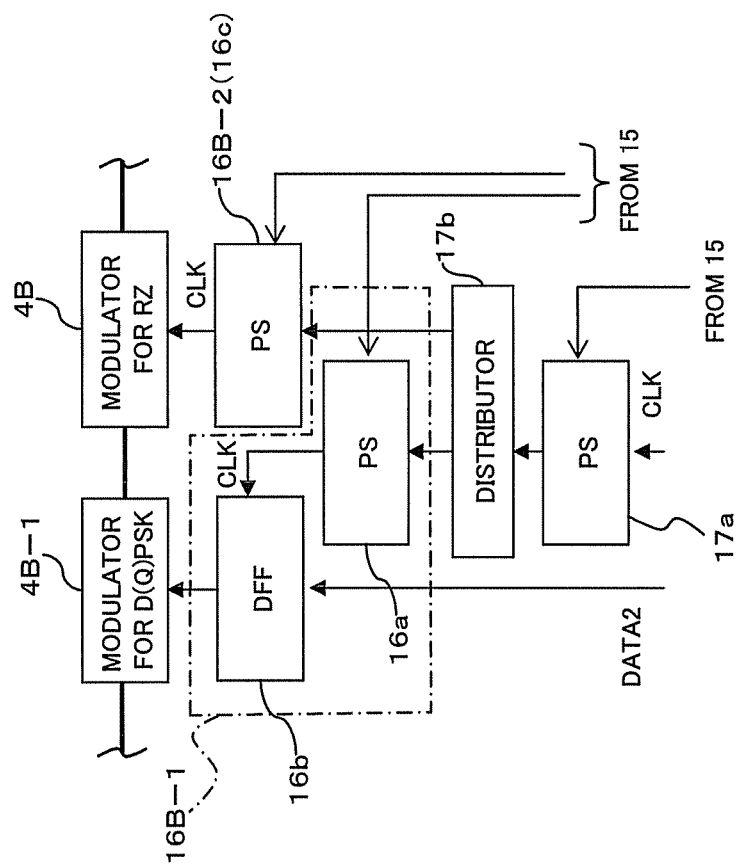
FIG. 15 is a diagram depicting an example of a delay amount varying unit.

FIG. 15 is a diagram depicting an example of the delay amount varying units 16B-1 and 16B-2 subjected to the control for the modulation timing matching of the delay control unit 15 together with an example of the delay amount varying unit 8b. The delay amount varying units 16A-1 and 16A-2 which control the modulation timings in the first phase modulating unit 4A-1 and the first intensity modulating unit 4A-2 under control of the delay control unit 15 can be similarly constructed.

The delay amount varying unit 16B-1 has a phase shifter (PS) 16a and a D flip flop (DFF) 16b. The phase shifter 16a controls the phase of an input clock signal based on the control signal from the delay control unit 15. The D flip flop 16b outputs a drive signal (DATA2) to the second phase modulating unit 4B-1 at a clock signal timing whose phase is controlled by the phase shifter 16a.

The delay amount varying unit 16B-2 has a phase shifter 16c which controls the phase of an input clock signal based on a control signal from the delay control unit 15. To the phase shifters 16a and 16c, a common clock signal is supplied from a distributor 17b which will be described later. By a control signal supplied from the delay control unit 15 to each of the phase shifters 16a and 16c, the phase shifting process is performed in each of the phase shifters 16a and 16c. By the process, the modulation timings in the second phase modulating unit 4B-1 and the second intensity modulating unit 4B-2 are adjusted.

Therefore, for example, a first modulation timing matching unit which match the modulation timings of the first phase modulating unit 4A-1 and the first strength modulating unit 4A-2 based on the monitor result of the first signal light monitor 12 is constructed by the delay control unit 15 and the delay amount varying units 16A-1 and 16A-2. For example, a second modulation timing matching unit which match the modulation timings of the second phase modulating unit 4B-1 and the second strength modulating unit 4B-2 based on the monitor result of the second signal light monitor 14 is constructed by the delay control unit 15 and the delay amount varying units 16B-1 and 16B-2.

As an example, a control apparatus which controls a delay time difference at a stage where light signals of two systems constructing a polarization multiplexing light modulator are polarization multiplexed is constructed by the output monitor 7, the delay control unit 15, and the delay amount varying unit 8b. Further, the control apparatus may include elements as the first and second modulation timing matching units.

A phase shifter 17a, the distributor 17b, and the DFF 16b operate together to function as an example of the delay amount varying unit 8b. To be specific, the phase shifter 17a shifts the phase of an input clock signal based on a control signal from the delay control unit 15 as the delay control unit 8a. The distributor 17b supplies the clock signal whose phase is shifted by the phase shifter 17a to the second phase modulating unit 4B-1 and the second intensity modulating unit 4B-2 via the delay amount varying units 16B-1 and 16B-2.

The clock signal whose phase is shifted by the phase shifter 17a is input to the DFF 16b via the phase shifter 16a. Therefore, the DFF 16b is an element of the delay amount varying unit 16B-1 and also an element of the delay amount varying unit 8b. The delay amount received by the second phase modulating unit 4B-1 is total of the phase shift amounts in the two phase shifters 17a and 16a. The delay amount received by the second intensity modulating unit 4B-2 is total of the phase shift amounts in the two phase shifters 17a and 16b.

With the configuration, the polarization multiplexing light modulator 10 of the second embodiment controls the delay time difference between polarization channels and matches the modulation timings of the phase modulating unit 4A-1 (4B-1) and the intensity modulating unit 4A-2 (4B-2) forming a polarization channel.

Figure 16:
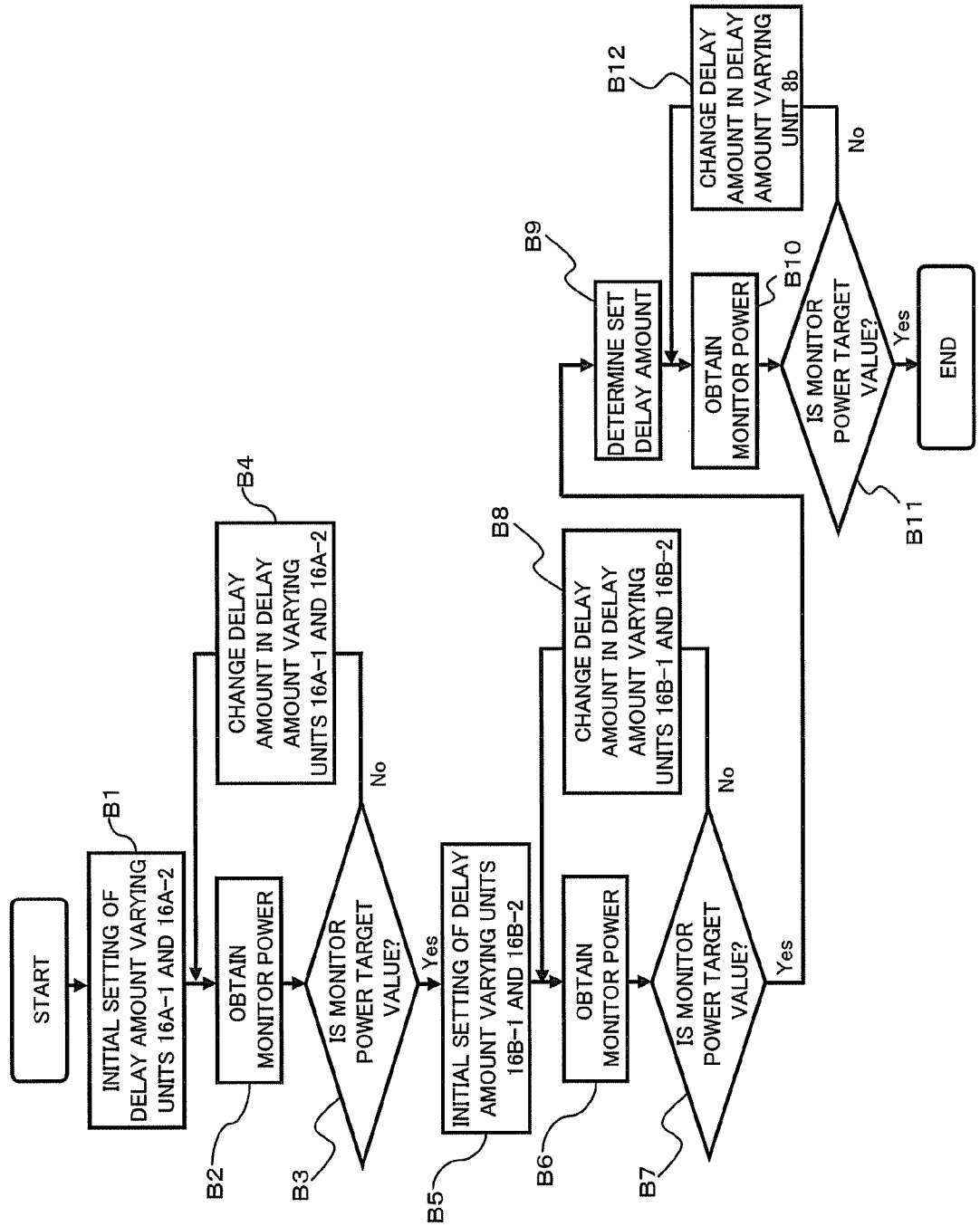
FIG. 16 is a flowchart for explaining the operation of the second embodiment.

FIG. 16 is a diagram explaining a control sequence for controlling the delay time difference between the polarization channels and matching the modulation timings of the phase modulating unit 4A-1 (4B-1) and the intensity modulating unit 4A-2 (4B-2) forming a polarization channel.

As depicted in FIG. 16, for example, the process of matching the modulation timings of the phase modulating unit 4A-1 and the intensity modulating unit 4A-2 forming the polarization channel starts. First, by the control signal from the delay control unit 15, the delay control amount to the delay amount varying units 16A-1 and 16A-2 (in the case of FIG. 15, the phase shift amount in the phase shifters 16a and 16b) is set to an initial value (step B1). The delay control unit 15 obtains a monitor power value (monitor power 1) from the first signal light monitor 12 (step B2).

When the obtained monitor power value is not a target value (or not in a range of target values), the delay control amount to the delay amount varying units 16A-1 and 16A-2 is changed (from the No route of step B3 to step B4). After that, each time the delay control amount changes, the monitor power is obtained, and the delay control amount is changed until the obtained monitor power value becomes the target value (or in a range of target values).

As described above, in the case where the target value of the monitor power is a low-frequency signal and a capacitor is provided as the band-limitation unit 12b as describe above, the target value can be set to the smallest (minimum) value. In the case of monitoring the frequency corresponding to the baud rate, the target value can be set to the largest (maximum) value. Alternatively, as the target value, a range of target values including a predetermined error around the target values can be set.

By determining the delay control amount to the delay amount varying units 16A-1 and 16A-2 by which a target monitor power is obtained as described above, matching of the modulation timings between the phase modulating unit 4A-1 and the intensity modulating unit 4A-2 is realized.

Subsequently, a process of matching the modulation timings between the phase modulating unit 4B-1 and the intensity modulating unit 4B-2 in a polarization channel is performed using a monitor power value (monitor power 2) from the second signal light monitor 14 in a manner similar to the above case (steps B5 to B8). By the process, matching of the modulation timings between the phase modulating unit 4B-1 and the intensity modulating unit 4B-2 is realized.

Next, control on a delay time difference between polarization channels similar to that in the first embodiment is performed by the delay control unit 15 and the delay amount varying unit 8b. First, based on transmission path parameters such as the characteristic of polarization mode dispersion, the nonlinear characteristic, and the like of a transmission path in a light transmission system to which the polarization multiplexing light modulator 10 is applied, a delay time difference to be controlled (set delay amount Tx) is determined (step B9). Subsequently, the delay control unit 15 obtains, as a target monitor power Px, the value of the monitor power with respect to the set delay amount Tx.

The delay control unit 15 controls the delay amount varying unit 8b so that the monitor result (that is, the monitor result of the power of the frequency component corresponding to the baud rate) from the power monitor unit 7c becomes the target monitor power Px obtained as described above. Concretely, the power monitor unit 7c measures the power of the frequency component corresponding to the baud rate component (step B10).

The delay control unit 15 compares the monitor power value Pmon as a measurement result with the target monitor power Px and outputs a control signal to the delay amount varying unit 8b so that Pmon lies in the range of a predetermined error (ΔPe) of Px. Specifically when Pmon is out of the error range, a delay amount is changed by the control signal to the delay amount varying unit 8b until Pmon falls in the error range (from the No route of step B11 to step B12).

When the monitor result from the power monitor unit 7c falls in a predetermined error range of the target monitor power Px, a feedback control of varying the delay time difference is finished, and the delay time difference at that time is maintained (Yes route of step B11). Therefore, for example, a control unit which controls a delay time difference at a stage where light signals of two systems forming the polarization multiplexing light modulator 10 are polarization multiplexed based on the monitor result from the output monitor 7 is constructed by the delay control unit 15 and the delay amount varying unit 8b.

In FIG. 16, the process of matching the modulation timings between the first phase modulating unit 4A-1 and the first intensity modulating unit 4A-2 is performed, and then the process of matching the modulation timings between the second phase modulating unit 4B-1 and the second intensity modulating unit 4B-2 is performed. However, any of the processes of matching the timings of phase modulation/intensity modulation in the polarization channels may be performed first, or the processes may be performed simultaneously.

The control of the delay time difference between the polarization channels has to be performed after matching of the modulation timings between the phase modulating unit 4A-1 (4B-1) and the intensity modulating unit 4A-2 (4B-2) in each of the polarization channels. In the case where the modulation timings between the phase modulating unit 4A-1 (4B-1) and the intensity modulating unit 4A-2 (4B-2) are not matched and are deviated from the optimum point, the relation of the monitor powers between the polarization channels with respect to the delay time difference changes.

Figure 17:
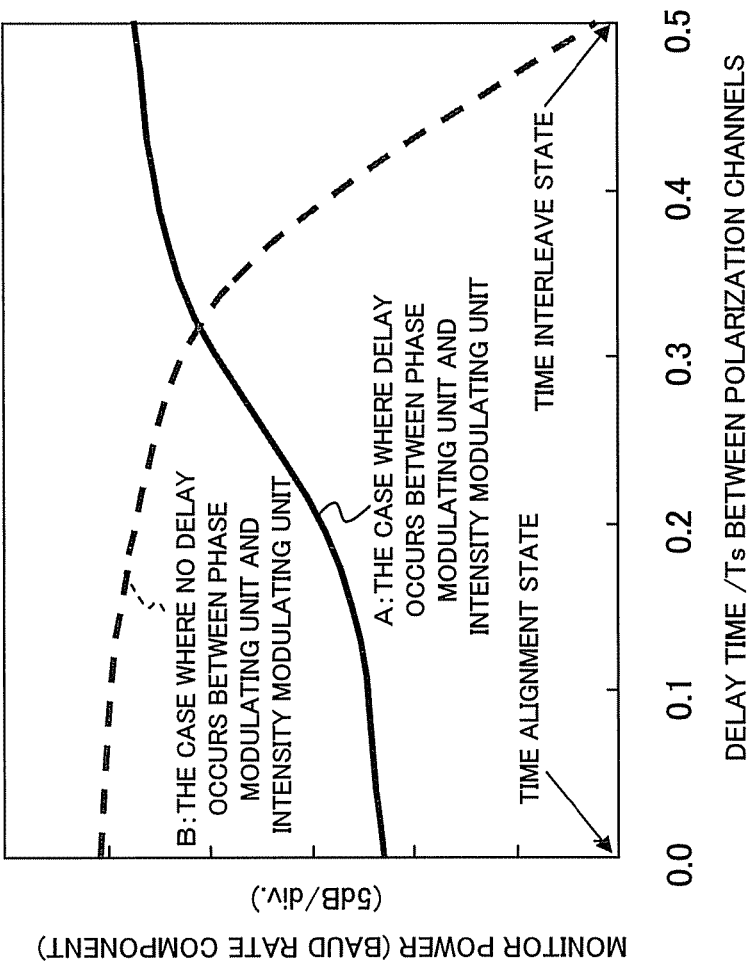
FIG. 17 is a diagram for explaining the effects of the second embodiment.

"A" in FIG. 17 depicts an example of the relation of the monitor power with respect to the delay time difference between the polarization channels in the case (A) where the modulation timings between the phase modulating unit 4A-1 (4B-1) and the intensity modulating unit 4A-2 (4B-2) in each polarization channel are not matched. On the other hand, "B" in FIG. 17 depicts an example of the relation of the monitor power with respect to the delay time difference between the polarization channels in the case (B) where the modulation timings between the phase modulating unit 4A-1 (4B-1) and the intensity modulating unit 4A-2 (4B-2) in each polarization channel are matched.

In "A" in FIG. 17, the modulation timings between the first phase modulating unit 4A-1 and the first intensity modulating unit 4A-2 are deviated from each other only by 0.25 symbol time (Ts) (delay occurs). The modulation timings between the second phase modulating unit 4B-1 and the second intensity modulating unit 4B-2 are deviated from each other only by −0.25 symbol time (Ts).

In this case, in the case (B) where the modulation timings match, the monitor power decreases during a period of a change in the delay time difference from 0.0 symbol time to 0.5 symbol time. However, in the case (A) where the modulation timings are deviated from each other, the monitor power increases during the period of a change in the delay time difference from 0.0 symbol time to 0.5 symbol time.

Specifically, in the case (A) where the modulation timings are deviated, it can be regarded that the power minimum point is not on a control point of the delay time difference of the inherent time interleave state but is on a control point of the time alignment state. Therefore, for example, when the delay time difference is controlled using a delay time difference between the polarization channels as the control target in the time interleave state, due to a change in dependency between minimum polarization channels of the monitor power obtained by the power monitor unit 7c, a case that the power minimum point is erroneously set on the time alignment state may occur.

Consequently, in the second embodiment, as depicted in FIG. 16, the control of the delay time difference between the polarization channels (steps B9 to B12) is performed after the modulation timing matching process (steps B1 to B8).

As described above, the second embodiment has advantages that the modulation timings between the phase modulating unit 4A-1 (4B-1) and the intensity modulating unit 4A-2 (4B-2) in a polarization channel can be matched, and the delay time difference between the polarization channels can be easily and surely controlled.

In the second embodiment as well, the delay amount varying unit 8b controls the delay time of a drive signal (data signal) for the light modulating unit 4B as one of the light modulating units. If a required relative delay time difference is obtained, delay times of drive signals for both of the light modulating units 4A and 4B may be controlled, or the delay time of the drive signal for the other light modulating unit 4A may be controlled.

In the second embodiment, the delay amount in the delay amount varying unit 8b is added to the delay amounts in the delay amount varying units 16B-1 and 16B-2 and the resultant amounts are used as drive signals to the phase modulating unit 4B-1 and the intensity modulating unit 4B-2. In other words, the delay amount varying unit 8b which gives the delay time difference between polarization channels is provided separately from the delay amount varying units 16B-1 and 16B-2. However, the delay amount given by the delay amount varying unit 8b may be given so as to be superimposed to the delay amount varying units 16B-1 and 16B-2 from the delay control unit 15. In this case, the function of the delay amount varying unit 8b can be provided to the delay amount varying units 16B-1 and 16B-2, so that the delay amount varying unit 8b may not be provided as a separate member.

In the second embodiment, the delay amount varying units 16A-1, 16B-1, 16A-2, and 16B-2 are disposed for the phase modulating units 4A-1 and 4B-1 and the intensity modulating units 4A-2 and 4B-2, respectively. However, the invention is not limited to the layout. Only one of the phase modulating units 4A-1 and 4B-1 and the intensity modulating units 4A-2 and 4B-2 may be disposed to match the modulation timings between the phase modulating unit and the intensity modulating unit.

Further, in the second embodiment, the frequency component monitored by the first signal light monitor 12 and that monitored by the second signal light monitor 14 may be the same frequency component or different frequency components.

[C] Description of Third Embodiment

Figure 18:
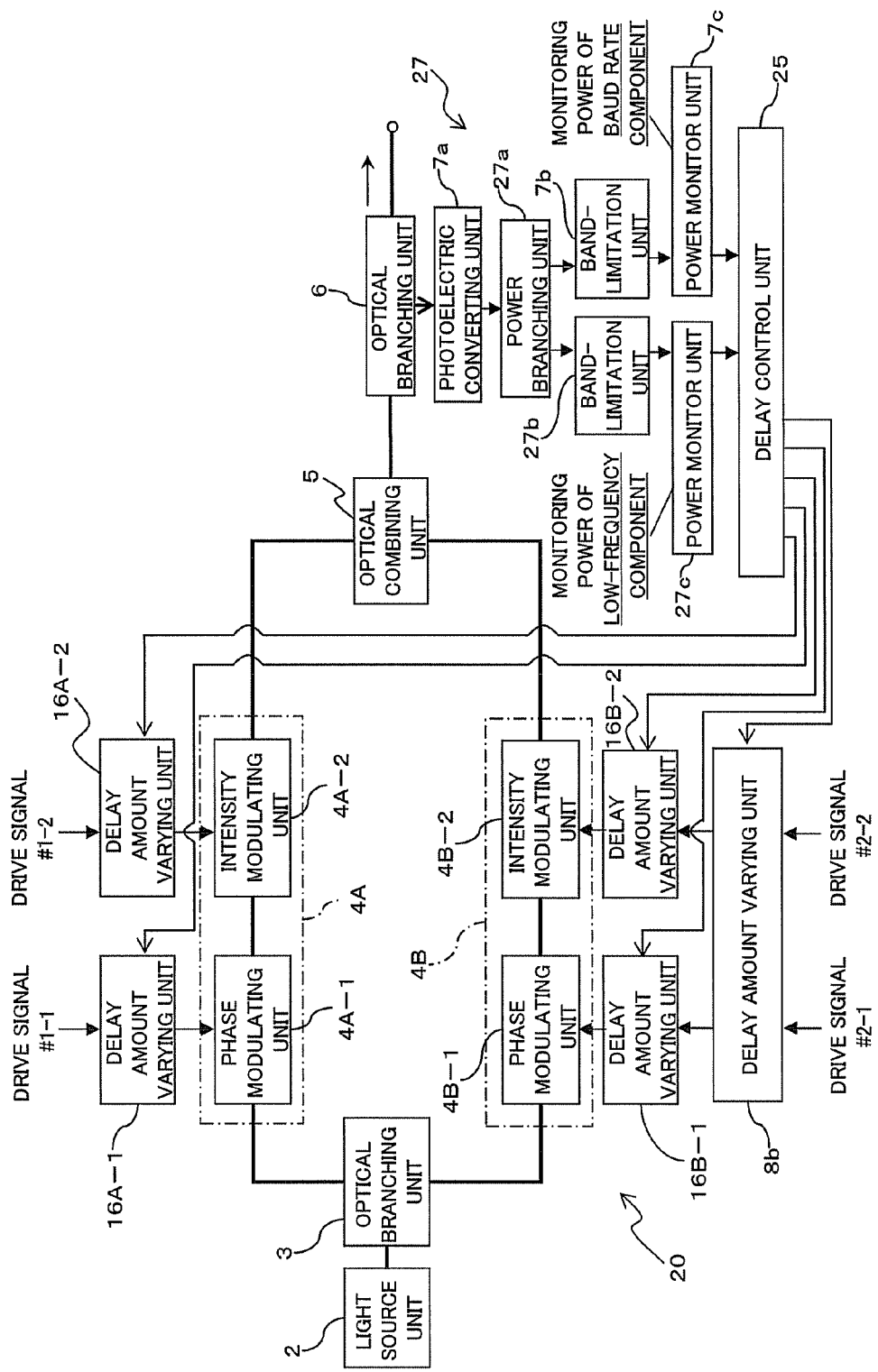
FIG. 18 is a diagram depicting a polarization multiplexing light modulator as a third embodiment.

FIG. 18 is a diagram depicting a polarization multiplexing light modulator 20 of a third embodiment. In a manner similar to the second embodiment, the polarization multiplexing light modulator 20 depicted in FIG. 18 controls the delay time difference between the polarization channels and matches modulation timings between the phase modulating unit and the intensity modulating unit in a polarization channel. In FIG. 18, components designated with the same reference numerals as those of FIG. 11 are similar to those of FIG. 11.

The polarization multiplexing light modulator 20 is different from the polarization multiplexing light modulator 10 of the second embodiment in the position of taking light used as the monitor power for matching the modulation timings between the phase modulating unit and the intensity modulating unit. That is, by extracting a low-frequency component whose power is to be monitored from light subjected to the polarization multiplexing in the optical combining unit 5, for example, output light of the polarization multiplexing light modulator 20, the process of matching the modulation timings between the phase modulating unit and the intensity modulating unit in a polarization channel is performed.

For the purpose, the polarization multiplexing light modulator 20 has an output monitor 27 which monitors output light of the polarization multiplexing light modulator 20. The output monitor 27 has the photoelectric converting unit 7a, the band-limitation unit 7b, and the power monitor unit 7c similar to those in the first and second embodiments and also has a power branching unit 27a, a band-limitation unit 27b, and a power monitor unit 27c.

As an example, a control apparatus is formed by the output monitor 27, the delay control unit 25, and the delay amount varying unit 8b. The control apparatus may further include the delay amount varying units 16A-1, 16A-2, 16B-1, and 16B-2 as elements of the modulation timing matching unit.

The photoelectric converting unit 7a receives a polarization multiplexed light signal from the optical branching unit 6 and converts it to an electric signal according to an amplitude change. The power branching unit 27a branches the electric signal output from the photoelectric converting unit 7a to two signals, and outputs one of the signals to the band-limitation unit 7b and the other signal to the band-limitation unit 27b in a manner similar to the first and second embodiments.

The band-limitation unit 7b performs band limiting process for passing a frequency component corresponding to the baud rate, in the electric signal from the photoelectric converting unit 7a. On the other hand, to the band-limitation unit 27b, a low-pass filter (LPF) is used together with a capacitor for cutting a DC component. The band-limitation unit 27b performs band limiting process on an electric signal from the photoelectric converting unit 7a. The band-limitation unit 27b eliminates, at least, DC components in the polarization multiplexed output light and passes low-frequency components lower than the baud rate of light modulations in the light modulating units 4A and 4B.

The power monitor unit 7c monitors the power of a frequency component corresponding to the baud rate from the band-limitation unit 7a. On the other hand, the power monitor unit 27c monitors the power of the low-frequency component based on the electric signal subjected to the band limiting process in the band-limitation unit 27b.

The delay control unit 25 has the function of the delay control unit 8a which controls the delay amount between the polarization channels via the delay amount varying unit 8b based on the monitor result from the power monitor unit 7c. Further, the delay control unit 25 performs a control of matching the modulation timings between the phase modulating unit and the intensity modulating unit in a polarization channel based on the monitor result from the power monitor unit 27c.

That is, based on the monitor result from the power monitor unit 27c, the modulation timings between the first phase modulating unit 4A-1 and the first intensity modulating unit 4A-2 are controlled via the delay amount varying units 16A-1 and 16A-2 similar to those of the second embodiment, and the modulation timings between the second phase modulating unit 4B-1 and the second intensity modulating unit 4B-2 are controlled via the delay amount varying units 16B-1 and 16B-2 similar to those of the second embodiment.

As depicted in FIG. 18, after the modulation timings between the phase modulating unit and the intensity modulating unit in a polarization channel are matched, the delay control unit 25 controls the delay time difference between the polarization channels. Further, in a modulation timing matching process performed first, a process of matching the modulation timings between the phase modulating unit and the intensity modulating unit in a polarization channel is sequentially performed.

Figure 19:
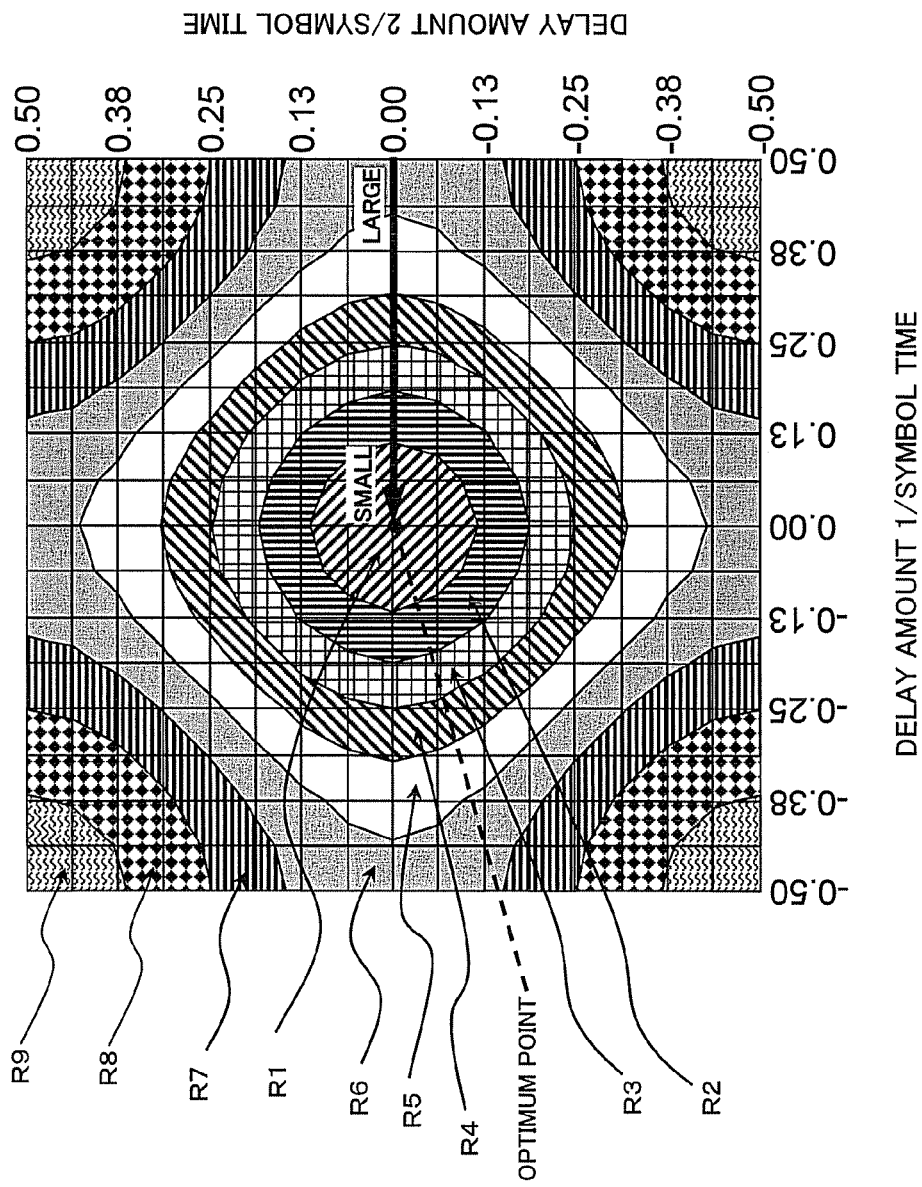
FIG. 19 is a diagram depicting the relation between low-frequency component power monitored by a power monitor unit and a deviation amount (delay amount) of modulation timings between a phase modulating unit and an intensity modulating unit.

FIG. 19 illustrates the relations among a low-frequency component power monitored by the power monitor unit 27c, a deviation amount (delay amount) in the modulation timings between the first phase modulating unit 4A-1 and the first intensity modulating unit 4A-2, and a deviation amount (delay amount) in the modulation timings between the second phase modulating unit 4B-1 and the second intensity modulating unit 4B-2 in the case of applying the capacitor as the band-limitation unit 27b.

The horizontal axis of FIG. 19 indicates the deviation amount (delay amount) in the modulation timings between the first phase modulating unit 4A-1 and the first intensity modulating unit 4A-2. The vertical axis corresponds to the deviation amount (delay amount) in the modulation timings between the second phase modulating unit 4B-1 and the second intensity modulating unit 4B-2. Each of regions R1 to R9 is obtained by dividing the magnitude of the monitor power in the power monitor unit 27c. The larger the number "i" in Ri is, the larger the monitor power is.

As depicted in FIG. 19, the distribution of magnitudes of the monitor power in each of the axes is the smallest around the deviation amount of zero as the optimum point and increases with distance from the deviation amount of zero. In other words, regardless of the value (delay amount) on the other axis, on one of the axes, the monitor power has the minimum value at the modulation timing as the optimum point (the value around the deviation amount of zero).

Specifically, a process of matching modulation timings between a phase modulating unit (4A-1) and an intensity modulating unit (4A-2) in one of the first and second modulating units 4A and 4B (for example, the modulating unit 4A) in two polarization channels is performed first. After that, a process of matching the modulation timings in the other modulating unit is performed second. As described above, by sequentially performing the process of matching the modulation timings while commonly using the monitor power value in the power monitor unit 27c, the monitor power value in the power monitor unit 27c can be also brought in the region R1 of the smallest value.

Figure 20:
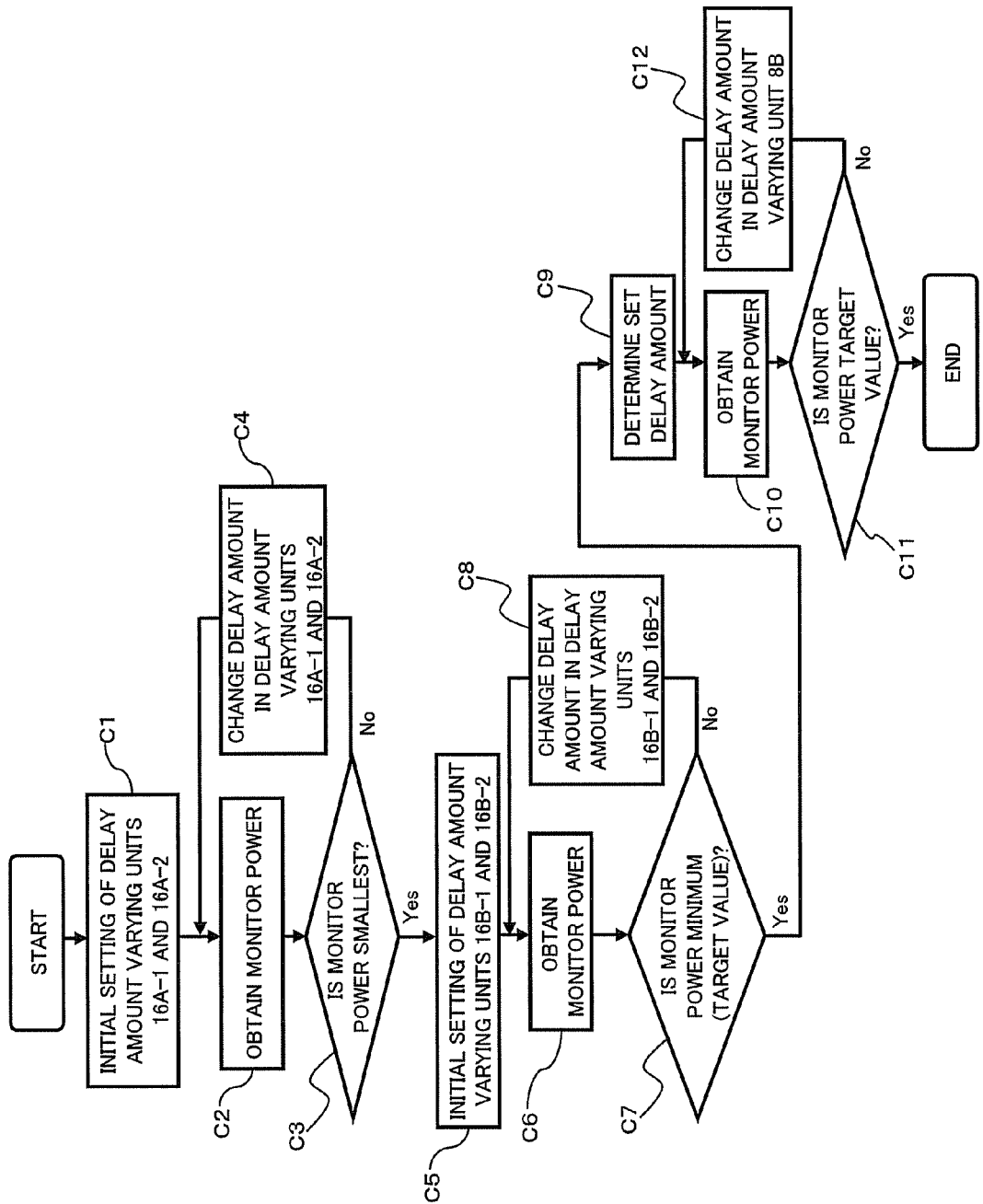
FIG. 20 is a flowchart for explaining operation of the third embodiment.

As depicted as an example in FIG. 20, a process of matching the modulation timings between the first phase modulating unit 4A-1 and the first intensity modulating unit 4A-2 in a polarization channel is performed ahead of the process of matching the modulation timings between the second phase modulating unit 4B-1 and the second intensity modulating unit 4B-2. Obviously, the matching processes may be performed in reverse.

First, by a control signal from the delay control unit 25, the delay control amount to the delay amount varying units 16A-1 and 16A-2 is set to an initial value (step C1). The delay control unit 25 obtains a monitor power value (monitor power 1) from the power monitor unit 27c (step C2).

The delay control amount to the delay amount varying units 16A-1 and 16A-2 is changed so that the obtained monitor power value becomes the minimum (from the No route in step C3 to step S4). After that, the monitor power is obtained each time the delay control amount is changed, and the delay control amount is changed until the obtained monitor power value becomes a value close to the minimum value.

By determining the delay control amount to the delay amount varying units 16A-1 and 16A-2 in which a value close to the minimum value is obtained as described above, matching between the phase modulating unit 4A-1 and the intensity modulating unit 4A-2 is realized.

Subsequently, a process of matching the modulation timings between the phase modulating unit 4B-1 and the intensity modulating unit 4B-2 in a polarization channel is performed in a manner similar to the above case by using a monitor power value (monitor power 2) from the power monitor unit 27c (steps C5 to C8). As a result, matching of the modulation timings between the phase modulating unit 4B-1 and the intensity modulating unit 4B-2 is realized. As a monitor power value of the power monitor unit 27c, a value around the region R1 depicted in FIG. 19 can be used.

Next, control on the delay time difference between polarization channels similar to that of the first embodiment is performed in the delay control unit 25 and the delay amount varying unit 8b based on a monitor result (monitor power 3) from the power monitor unit 7c (steps C9 to C12). By the control, the delay time difference between the polarization channels can be determined as a target time difference (for example, the time interleave state or the time alignment state).

As described above, the third embodiment also has advantages that the modulation timings between the phase modulating unit 4A-1 (4B-1) and the intensity modulating unit 4A-2 (4B-2) in a polarization channel can be matched, and the delay time difference between the polarization channels can be easily and surely controlled.

Figure 21:
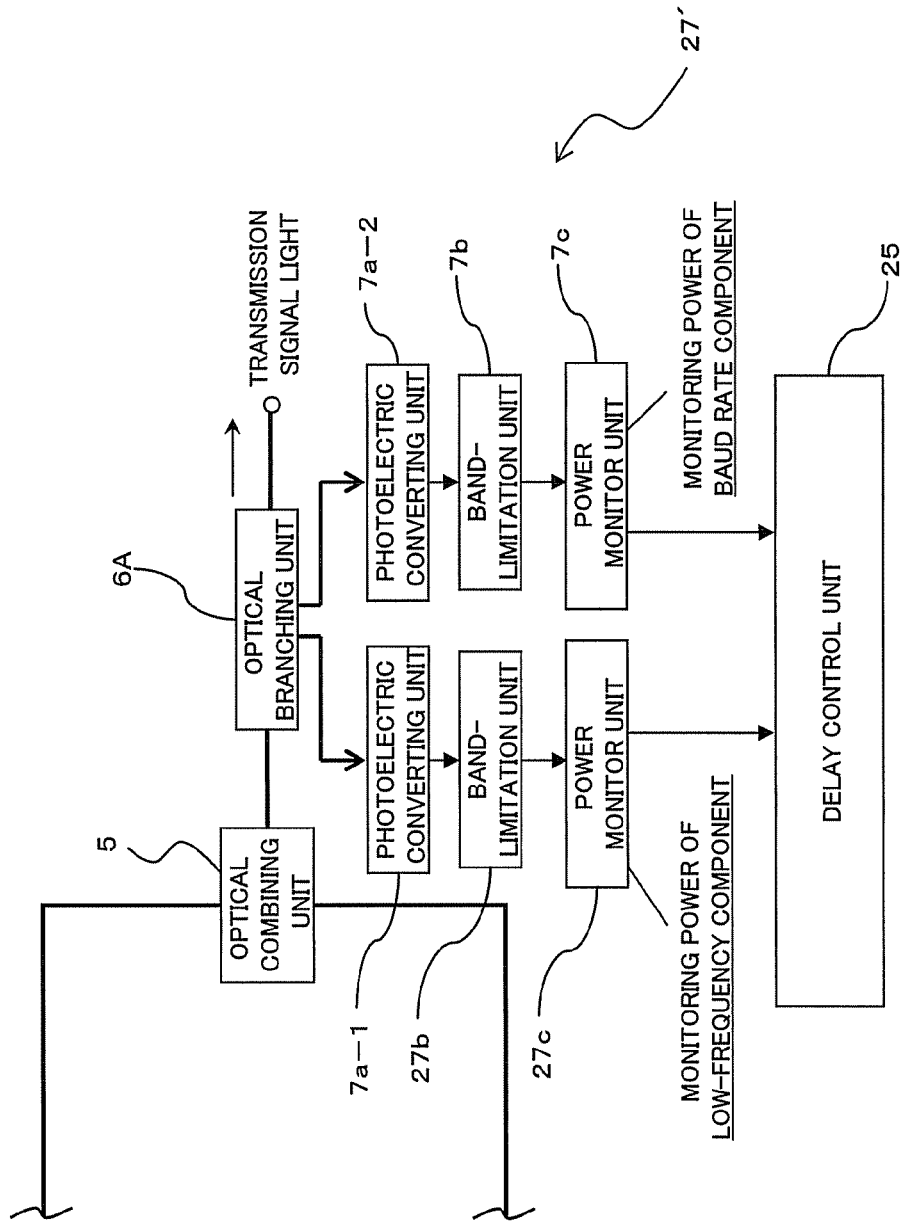
FIG. 21 is a diagram depicting a modification of the third embodiment.

FIG. 21 is a diagram depicting a modification of an output monitor 27' of the third embodiment. The above-described reference numerals in FIG. 21 indicate components similar to the above. The output monitor 27' has photoelectric converting units 7a-1 and 7a-2, band-limitation units 7b and 27b, and power monitor units 7c and 27c. The above-described reference numerals indicate components similar to the above.

In FIG. 20, the power branching unit 27a branches the electric signal from the photoelectric converting unit 7a into two signals. In contrast, in the modification depicted in FIG. 21, an optical branching unit 6A branches polarization multiplexed output light that is output from the optical combining unit 5 into three light beams. The first light beam is set as transmission signal light, and the second and third light beams are received by the photoelectric converting units 7a-1 and 7a-2 and the resultant signals are output as electric signals.

The electric signal output from the photoelectric converting unit 7a-1 can be used for the process of matching the modulation timings between the phase modulating unit and the intensity modulating unit in a polarization channel. Consequently, the band-limitation unit 27b includes a capacitor which cuts DC components in the electric signal from the photoelectric converting unit 7a-1 and a filter which passes frequency components lower than the frequency corresponding to the baud rate. The power monitor unit 27c monitors the power of the low-frequency component and outputs the monitor result to the delay control unit 25. When the photoelectric converting unit 7a-1 has the function of the band-limitation unit 27b, the band-limitation unit 27b can be properly omitted.

The electric signal output from the photoelectric converting unit 7a-2 can be used for the control on the delay time difference between the polarization channels. In relation to the signal output from the photoelectric converting unit 7a-2, in a manner similar to the first embodiment, the band limiting process in the band-limitation unit 7b and the process of monitoring the power of the frequency component corresponding to the baud rate in the power monitor unit 7c are performed.

Also in the case of constructing the output monitor as depicted in FIG. 21, an effect similar to that in the third embodiment can be produced.

In FIGS. 18 and 21, the power monitor units 7c and 27c can be arranged as a common unit in a physical configuration.

[D] Description of Fourth Embodiment

Figure 22:
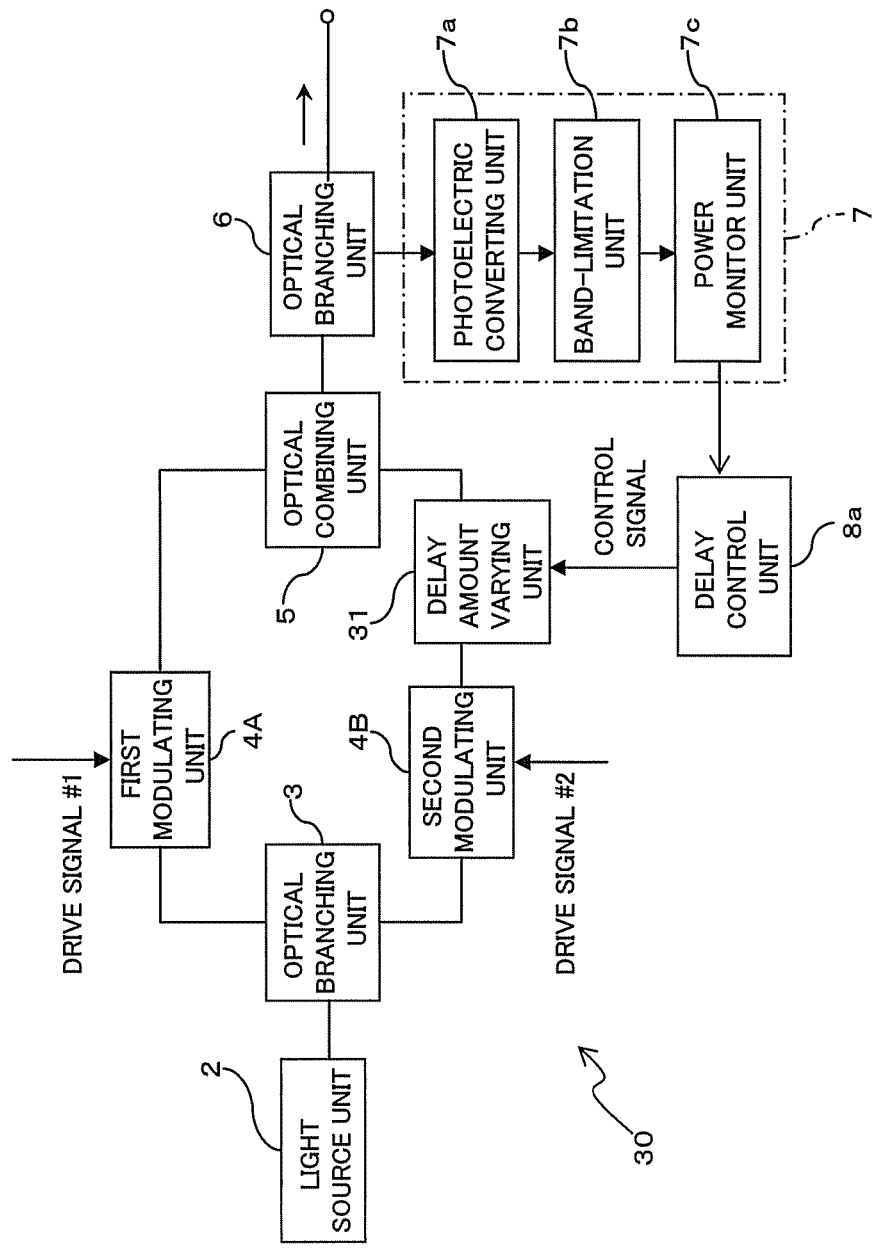
FIG. 22 is a diagram depicting a polarization multiplexing light modulator as a fourth embodiment.

FIG. 22 is a diagram depicting a polarization multiplexing light modulator in a fourth embodiment. A polarization multiplexing light modulator 30 depicted in FIG. 22 controls the delay time difference between polarization channels, different from the first embodiment, not by the drive signals to the first and second modulating units 4A and 4B but by a delay amount varying unit 31 which delays light. The above-described reference numerals indicate similar components.

The delay amount varying unit 31 is interposed, for example, in a light propagation path between the second modulating unit 4B and the optical combining unit 5 and delays light of an amount of time according to a control signal on input signal light. As an example of the delay amount varying unit 31, a motorized variable optical delay line of General Photonics Corporation can be applied. In FIG. 22, the delay amount varying unit 31 is provided in the light propagation path between the second modulating unit 4B and the optical combining unit 5. The delay amount varying unit 31 may be interposed in the light propagation path between the first modulating unit 4B and the optical combining unit 5 or both of the light propagation paths.

Also in the fourth embodiment, in a manner similar to the first embodiment, the delay time difference at the stage where light signals of two systems forming the polarization multiplexing light modulator 30 are polarization multiplexed (that is, the input stage to the optical combining unit 5) can be controlled. Therefore, the delay time difference between the polarization channels can be controlled easily and surely.

The configuration of controlling the delay time difference in the fourth embodiment can be obviously applied to the second and third embodiments.

Figure 23:
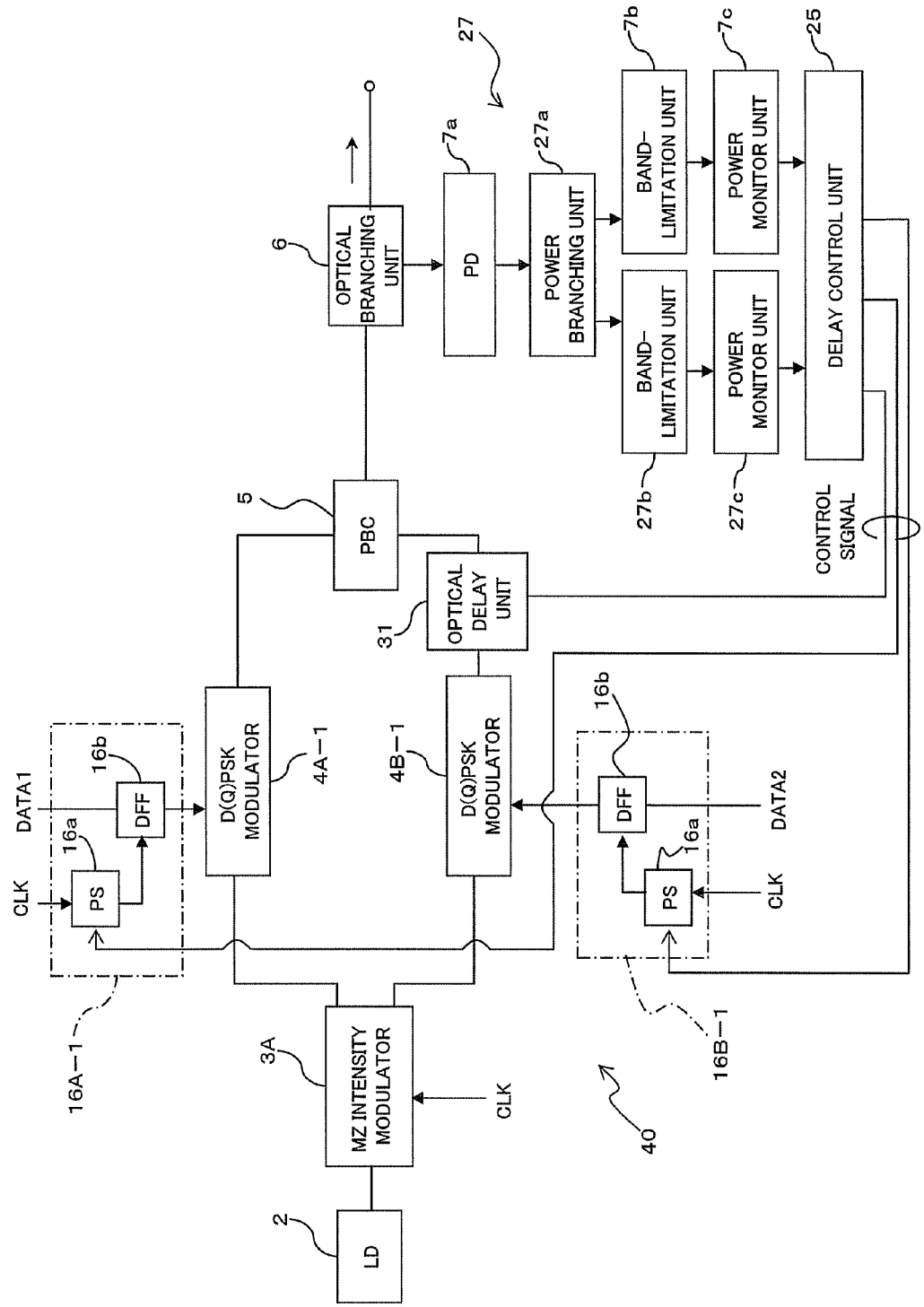
FIG. 23 is a diagram depicting a modification of the fourth embodiment.

FIG. 23 is a diagram depicting a modification of the fourth embodiment. A polarization multiplexing light modulator 40 depicted in FIG. 23 is provided with a Mach-Zehnder (MZ) intensity modulating unit (intensity modulating unit) 3A which outputs RZ light signals of two systems obtained by inverting the light from the light source (LC) 2 (the phases are deviated by $\pi$) in place of the optical branching unit 3 in each of the foregoing embodiments. A PBC is provided as an example of the optical combining unit 5, and an optical coupler (optical CPL) is provided as an example of the optical branching unit 6.

The phase modulating units 4A-1 and 4B-1 modulate the phase of an RZ light signal of each system and output the RZ phase modulated light signal. For example, in the case where the phase modulating units 4A-1 and 4B-1 are D(Q)PSK modulating units, a RZ-D (Q) PSK light signal can be obtained.

In other words, the intensity modulating unit 3A has the function of the first and second intensity modulating units 4A-2 and 4B-2 in the second and third embodiments. That is, each of two polarization channels as light modulations of two systems performs light phase modulation and performs light intensity modulation depending on the light phase modulation. To the phase modulating units 4A-1 and 4B-1, various modulating methods such as DPSK modulation and DQPSK modulation can be applied.

The output monitor 27 similar to that of the third embodiment is provided to monitor a frequency component corresponding to the baud rate of polarization multiplexing output light in order to control the delay time difference between polarization channels and monitor a low-frequency component of polarization multiplexing output light in order to match modulation timings.

Specifically, according to a monitor result of the low-frequency component from the power monitor unit 27c, the delay control unit 25 sequentially controls a delay amount for one of the delay amount varying units 16A-1 and 16A-2 so that the monitor result becomes the minimum value. Each of the delay amount varying units 16A-1 and 16A-2 has, for example, the PS 16a and the DFF 16b.

The PS 16a performs phase shift on an input clock based on a control signal from the delay control unit 25. The DFF 16b outputs drive signals (DATA1 and DATA2) to the corresponding first and second phase modulators 4A-1 and 4B-1 at clock signal timings subjected to the phase control in the corresponding phase shifter 16a. In FIG. 23, RZ light signals having opposite phases are supplied from the intensity modulating unit 3A to the first and second phase modulating units 4A-1 and 4B-1. Consequently, to the drive signals DATA1 and DATA2, delay time is given in correspondence with the RZ light signals having opposite phases via the delay control unit 25 and the delay amount varying units 16A-1 and 16B-1, thereby matching the modulation timings.

In the delay control unit 25, the process of matching the modulation timings for the modulating units 4A-1 and 4B-1 is performed as described above, and the delay time difference between the polarization channels is controlled via the control on the delay amount varying unit 31. Consequently, the delay time difference between polarization channels can be easily and surely controlled.

[E] Others

Each of the polarization multiplexing light modulators in the foregoing embodiments can be used as an element of a light transmitting apparatus. The present invention can be applied to a light transmitting apparatus having a plurality of polarization multiplexing light modulators, wavelength-multiplexing light output from the polarization multiplexing light modulators, and transmitting the multiplexed light.

All examples and conditional language recited herein are intended for pedagogical purposes to aid the reader in understanding the principles of the invention and concepts contributed by the inventor to furthering the art, and are to be construed as being without limitation to such specifically recited examples and conditions, or does the organization of such examples in the specification relate to a depicting of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A control apparatus comprising:
   a filter which has filter characteristics that pass only a frequency component corresponding to a baud rate, the frequency component is included in polarization-multiplexed output light that is output from a polarization multiplexing light modulator which performs light modulation on two systems independent of each other, polarization-multiplexes light signals of the two systems subjected to the light modulation, and outputs the polarization-multiplexed light signals;
   an output monitor which monitors the frequency component that is passed by the filter; and
   a control unit which controls a delay time difference at a stage where the light signals of the two systems forming the polarization multiplexing light modulator are polarization-multiplexed based on a monitor result of power of the frequency component, wherein
   the control unit comprises:
   a storage unit which stores a correspondence table of the delay time difference according to the power of the frequency component, the correspondence table set in such a manner that the delay time difference is "0" or one symbol time when the power is a maximum value in the correspondence table and the delay time difference is a half of the symbol time when the power is a minimum value in the correspondence table; and
   a control signal output unit which outputs a control signal for controlling the delay time difference in accordance with the amount of the delay time difference corresponding to the monitor result of the power of the frequency component.

2. The control apparatus according to claim 1, wherein the output monitor monitors a frequency component derived from baud rate in light modulation of the two systems, included in the output light from the polarization multiplexing light modulator and a low-frequency component of a frequency lower than the baud rate, and
   the control unit comprises:
   a low-frequency oscillating unit which oscillates a low-frequency signal having the low frequency;
   a low-frequency superimposing unit which superimposes the low-frequency signal from the low-frequency oscillating unit on a control signal for controlling the delay time difference;
   a low-frequency detecting unit which detects a fluctuation derived from the low-frequency signal of power of the frequency component from a monitor result of the output monitor; and a control signal output unit which outputs the control signal in accordance with a detection result from the low-frequency detecting unit.

3. The control apparatus according to claim 1, wherein each of the light modulations of the two systems is a method of performing light phase modulation and also light intensity modulation subject to the light phase modulation, and comprises:
   a first light signal monitor and a second light signal monitor which monitors light signals of the two systems subjected to the light modulations; and
   a first modulation timing matching unit and a second modulation timing matching unit which match modulation timings of light phase modulation and light intensity modulation constructing the light modulations of the two systems based on monitor results in the first and second light signal monitors.

4. The control apparatus according to claim 1, wherein each of the light modulations of the two systems is a method of performing light phase modulation and light intensity modulation subject to the light phase modulation,
   the output monitor monitors a frequency component derived from baud rate in the light modulations of the two systems, included in output light from the polarization multiplexing light modulator and also a low-frequency component of a frequency lower than the baud rate, and
   the apparatus comprises a first modulation timing matching unit and a second modulation timing matching unit which match modulation timings of light phase modulation and light intensity modulation constructing the light modulations of the two systems based on monitor results of the low-frequency component in the output monitor.

5. The control apparatus according to claim 1, wherein the control unit controls the delay time difference by controlling modulation timings for modulating units which perform light modulations of the two systems.

6. The control apparatus according to claim 1, wherein the control unit controls the delay time difference by controlling a delay amount in a light delay unit provided for both or one of light propagation paths at the ante stage of the polarization multiplexing on light signals of two systems subjected to the light modulations.

7. A polarization multiplexing light modulator comprising:
   a first modulator and a second modulator which performs light modulations of two systems independent of each other on input light;
   a polarization multiplexer which polarization-multiplexes light signals of the two systems subjected to light modulations in the first and second modulators, and outputting the polarization-multiplexed light signals;
   a filter which has filter characteristics that pass only a frequency component corresponding to a baud rate, the frequency component is included in the polarization-multiplexed light signals;
   an output monitor which monitors the frequency component that is passed by the filter; and
   a control unit which controls a delay time difference at a stage where the light signals of the two systems are polarization-multiplexed in the polarization multiplexer based on a monitor result of power of the frequency component, wherein the control unit comprises:
  a storage unit which stores a correspondence table of the delay time difference according to the power of the frequency component, the correspondence table set in such a manner that the delay time difference is "0" or one symbol time when the power is a maximum value in the correspondence table and the delay time difference is a half of the symbol time when the power is a minimum value in the correspondence table; and
  a control signal output unit which outputs a control signal for controlling the delay time difference in accordance with the amount of the delay time difference corresponding to the monitor result of the power of the frequency component.

8. The polarization multiplexing light modulator according to claim 7, wherein the output monitor includes:
  a photoelectric converter which converts output light from the polarization multiplexing light modulator to an electric signal; and
  a power monitor which monitors power of the frequency component based on the electric signal from the photoelectric converter.

9. The polarization multiplexing light modulator according to claim 7, wherein each of the first and second modulating units comprises:
  a light phase modulating unit which performs light phase modulation; and
  a light intensity modulating unit which performs light intensity modulation subject to light phase modulation in the light phase modulating unit.

10. The polarization multiplexing light modulator according to claim 9, further comprising:
  a first signal monitor and a second light signal monitor which monitors light signals of two systems subjected to the light modulation in the first and second modulating units, respectively; and
  a first modulation timing matching unit and a second modulation timing matching unit which match modulation timings of the light phase modulating unit and the light intensity modulating unit in each of the first and second modulating units based on monitor results of the first and second light signal monitors.

11. The polarization multiplexing light modulator according to claim 9, wherein
  the output monitor monitors a frequency component derived from baud rate in light modulations of the two systems, included in output light from the polarization multiplexing light modulator, and a low-frequency component of a frequency lower than the baud rate, and
  the modulator comprises a first modulation timing matching unit and a second modulation timing matching unit which match modulation timings of light phase modulation and light intensity modulation as light modulation of the two systems based on monitor results of the low-frequency components in the output monitor.

12. The polarization multiplexing light modulator according to claim 7, wherein the control unit controls the delay time difference by controlling modulation timings for the first and second modulating units.

13. The polarization multiplexing light modulator according to claim 7, wherein
  a variable light delaying unit is provided for both or one of light propagation paths at the ante stage of the polarization multiplexing on light signals of the two systems, and
  the control unit controls the delay time difference by controlling a delay amount in the variable light delaying unit.

14. The polarization multiplexing light modulator according to claim 7, further comprising:
  a light source; and
  an optical branching unit which branches light from the light source into two light signals and guiding the two branched light signals to the first and second modulator.

15. The polarization multiplexing light modulator according to claim 7, further comprising:
  a first light source which outputs input light to the first modulating unit; and
  a second light source which outputs input light to the second modulating unit.

16. A light transmitting apparatus comprising the polarization multiplexing light modulator according to claim 7.

17. The control apparatus according to claim 1, wherein the baud rate is different from a bit rate.

* * * * *